(12) United States Patent
Mischler et al.

(10) Patent No.: US 11,047,582 B2
(45) Date of Patent: Jun. 29, 2021

(54) METHOD AND DEVICES FOR CONTROLLING A FLUID TRANSPORTATION NETWORK

(71) Applicant: BELIMO HOLDING AG, Hinwil (CH)

(72) Inventors: Stefan Mischler, Hinwil (CH); Ronald Aeberhard, Hinwil (CH); Forest Reider, Zurich (CH); Marc Thuillard, Hinwil (CH)

(73) Assignee: BELIMO HOLDING AG, Hinwil (CH)

( * ) Notice: Subject to any disclaimer, the term of this patent is extended or adjusted under 35 U.S.C. 154(b) by 45 days.

(21) Appl. No.: 16/099,293

(22) PCT Filed: May 17, 2017

(86) PCT No.: PCT/EP2017/061840
§ 371 (c)(1),
(2) Date: Nov. 6, 2018

(87) PCT Pub. No.: WO2017/220263
PCT Pub. Date: Dec. 28, 2017

(65) Prior Publication Data
US 2019/0107292 A1    Apr. 11, 2019

(30) Foreign Application Priority Data
Jun. 22, 2016  (CH) ........................... 0790/16

(51) Int. Cl.
*F24D 10/00* (2006.01)
*F24D 19/10* (2006.01)

(52) U.S. Cl.
CPC ....... *F24D 10/003* (2013.01); *F24D 19/1015* (2013.01); *F24D 2220/0207* (2013.01);
(Continued)

(58) Field of Classification Search
CPC ............... F24D 10/003; F24D 19/1015; F24D 2220/0207; F24D 2220/0228;
(Continued)

(56) References Cited

U.S. PATENT DOCUMENTS 3,889,878 A * 6/1975 Evans .................. F16K 11/074
237/8 R
3,955,597 A * 5/1976 Oneyama ............ F15B 13/0405
137/625.25
(Continued)

FOREIGN PATENT DOCUMENTS

CH         705 143 A1    12/2012
CN       102162653 A      8/2011
(Continued)

OTHER PUBLICATIONS

"WO_2012010127_A2_M—Machine Translation.pdf", machine translation, EPO.org, May 11, 2020.*
(Continued)

*Primary Examiner* — Daniel E. Namay
(74) *Attorney, Agent, or Firm* — Sughrue Mion, PLLC

(57) ABSTRACT

A fluid transportation network (1) comprises a plurality of parallel zones (Z1, Z2), fed by a common supply line (L), with a regulating zone valve (V1, V2) in each zone (Z1, Z2) for regulating a flow of fluid ($\phi_1$, $\phi_2$) through the respective zone (Z1, Z2). A processing unit (RE) receives valve positions ($pos_1$, $pos_2$) of the regulating zone valves (V1, V2) and determines and sets an adjusted valve position for a line valve (VE) arranged in the supply line (L), depending on the valve positions ($pos_1$, $pos_2$) of the regulating zone valves (V1, V2). A processing unit (RE) further receives a measurement of a total flow of fluid ($\phi_{tot}$) through the supply line (L) and determines and sets adjusted valve positions for the regulating zone valves (V1, V2), depending on the measure-
(Continued)

ment of the total flow of fluid ($\phi_{tot}$) through the supply line (L).

20 Claims, 8 Drawing Sheets

(52) U.S. Cl.
CPC ............ F24D 2220/0228 (2013.01); F24D 2220/0242 (2013.01); F24D 2220/0292 (2013.01); F24D 2220/044 (2013.01); F24D 2220/046 (2013.01); F24D 2220/048 (2013.01); F24D 2220/06 (2013.01)

(58) Field of Classification Search
CPC ..... F24D 2220/0242; F24D 2220/0292; F24D 2220/044; F24D 2220/046; F24D 2220/048; F24D 2220/06
USPC .................................................. 237/8 R, 8 A
See application file for complete search history.

(56) References Cited

U.S. PATENT DOCUMENTS

| | | | | |
|---|---|---|---|---|
| 4,331,291 | A * | 5/1982 | Dean | F24F 11/76 236/49.4 |
| 4,434,746 | A * | 3/1984 | Stewart | G05D 23/1934 122/448.1 |
| 4,598,669 | A * | 7/1986 | Funk | G05D 23/1917 122/448.1 |
| 4,844,335 | A * | 7/1989 | McKinley | G05D 23/1934 237/8 R |
| 4,863,100 | A * | 9/1989 | Erhardt | F24D 19/1015 237/8 R |
| 4,947,928 | A * | 8/1990 | Parker | F24F 11/76 165/208 |
| 4,978,063 | A * | 12/1990 | Chase | F24D 19/1051 237/19 |
| 5,178,324 | A * | 1/1993 | Moesby | F24D 10/006 237/8 R |
| 5,179,524 | A * | 1/1993 | Parker | F24F 11/30 700/277 |
| 5,180,102 | A * | 1/1993 | Gilbert | F24F 11/76 236/49.3 |
| 5,190,215 | A * | 3/1993 | Habermehl, Jr. | G05D 23/1931 165/291 |
| 5,775,581 | A * | 7/1998 | Welden | F24D 12/02 237/56 |
| 5,979,167 | A * | 11/1999 | Kochavi | F24F 3/044 62/186 |
| 6,220,518 | B1 * | 4/2001 | Kline | G05B 15/02 236/49.3 |
| 6,241,156 | B1 * | 6/2001 | Kline | G05B 15/02 236/49.3 |
| 6,338,437 | B1 * | 1/2002 | Kline | G05B 15/02 236/49.3 |
| 6,879,881 | B1 * | 4/2005 | Attridge, Jr. | F24F 11/30 700/277 |
| 7,506,617 | B2 * | 3/2009 | Paine | F23N 1/082 122/448.3 |
| 8,024,161 | B2 | 9/2011 | Pekar et al. | |
| 8,271,143 | B2 * | 9/2012 | Deivasigamani | F24D 17/0078 700/282 |
| 8,965,584 | B2 * | 2/2015 | Deivasigamani | F24D 19/1051 700/275 |
| 9,958,883 | B2 * | 5/2018 | D'Silva | G05D 23/1917 |
| 2008/0053115 | A1 * | 3/2008 | Trantham | F24D 19/1015 62/118 |
| 2008/0203866 | A1 * | 8/2008 | Chamberlain | F24F 1/0007 312/236 |
| 2010/0147394 | A1 | 6/2010 | Trnka et al. | |
| 2010/0319783 | A1 * | 12/2010 | Kim | F24D 19/1015 137/10 |
| 2011/0162742 | A1 * | 7/2011 | Ulens | F24D 19/1024 137/624.27 |
| 2011/0297364 | A1 | 12/2011 | Loeffler | |
| 2012/0061483 | A1 * | 3/2012 | Lee | E03B 1/04 237/8 A |
| 2012/0090826 | A1 * | 4/2012 | Cimberio | F16K 5/0605 165/200 |
| 2012/0185102 | A1 | 7/2012 | Skoglund et al. | |
| 2013/0048114 | A1 * | 2/2013 | Rothman | G05B 15/02 137/551 |
| 2014/0034145 | A1 * | 2/2014 | Burt | F24D 19/0095 137/59 |
| 2014/0097367 | A1 | 4/2014 | Burt | |
| 2014/0150883 | A1 | 6/2014 | Lederle et al. | |
| 2014/0261714 | A1 * | 9/2014 | Burt | F24D 19/1015 137/10 |
| 2015/0019022 | A1 * | 1/2015 | Karamanos | G05D 7/0647 700/276 |
| 2015/0316935 | A1 * | 11/2015 | Schmidlin | F24D 19/1015 700/282 |
| 2016/0131381 | A1 * | 5/2016 | Schmidlin | H04L 12/2818 700/277 |
| 2016/0152507 | A1 * | 6/2016 | Brown | C03B 33/04 65/53 |
| 2016/0179109 | A1 * | 6/2016 | Iversen | F16K 31/0668 137/565.01 |
| 2016/0245541 | A1 * | 8/2016 | Karamanos | F24F 11/30 |
| 2016/0291608 | A1 * | 10/2016 | Reider | F24D 19/1009 |
| 2017/0030593 | A1 * | 2/2017 | O'Connor | F24D 19/1012 |
| 2017/0045255 | A1 * | 2/2017 | Karamanos | F24F 11/79 |
| 2017/0067665 | A1 * | 3/2017 | Whitmore | F16K 27/067 |
| 2017/0299200 | A1 * | 10/2017 | Mercier, Sr. | F24D 19/1012 |
| 2017/0370324 | A1 * | 12/2017 | Shibata | F02G 5/00 |
| 2018/0094373 | A1 * | 4/2018 | Long | D06B 9/02 |
| 2018/0113481 | A1 * | 4/2018 | Faiczak | G05D 16/2026 |
| 2019/0011136 | A1 * | 1/2019 | Rosen | F24D 10/003 |
| 2020/0340689 | A1 * | 10/2020 | Overgaard | G05D 23/1934 |

FOREIGN PATENT DOCUMENTS

| | | |
|---|---|---|
| CN | 102369398 A | 3/2012 |
| CN | 102927620 A | 2/2013 |
| CN | 204476891 U | 7/2015 |
| DE | 34 06 355 A1 | 8/1985 |
| DE | 199 12 588 A1 | 9/2000 |
| DE | 697 06 458 T2 | 4/2002 |
| DE | 10 2014 013 464 A1 | 3/2016 |
| EP | 0 795 724 A1 | 9/1997 |
| EP | 2 085 707 A2 | 8/2009 |
| EP | 2 157 376 A2 | 2/2010 |
| EP | 2 434 226 A2 | 3/2012 |
| WO | 98/25086 A1 | 6/1998 |
| WO | 2012/010127 A2 | 1/2012 |

OTHER PUBLICATIONS

"Google Translate 2020-05-11.pdf", machine translation, Google.com, May 11, 2020.*

"NPL—Brochure—E-PIM Fm35p1r0505 2005.pdf", Brochure: E-PIM, Acutherm, 2005. (Year: 2005).*

"NPL—Brochure—PIM Fm071p1010105 2011.pdf", Brochure: 'PIM' Pressure Independence Module, Acuther, 2011. (Year: 2011).*

"NPL—Brochure—TF—Fm12p1 2002-06.pdf", Brochure: TF-HC Therma-Fuser Thermally Powered VAV Module, Acutherm, 2002. (Year: 2002).*

"NPL—Brochure—TF—Fm041p1010008.pdf", Brochure: TF Therma-Fuser Square Thermally Powered VAV Diffuser, Acutherm, 2010. (Year: 2010).*

"NPL—Design—Constant vol. DX Fm6p5r0504 2005.pdf", Design: Constant vol. DX Units Including Heat Pumps Zoned With Therma-Fuser VAV Diffusers, Acuther, 2005. (Year: 2005).*

"NPL—Design—Essentials System Fm6p2r0409 2004.pdf", Design: Essentials of a Modular VAV System, Acutherm, 2004. (Year: 2004).*

(56) References Cited

OTHER PUBLICATIONS

"NPL—Design—Static Pressure Control Fm6p3r0502 2005.pdf", Design: Options of Static Pressure Control and Pressure Independence, Acutherm, 2005. (Year: 2005).*
"NPL—Design—Thermal VAV System Fm5p2r0905 2004.pdf", Designing Mudular VAV Systems, Acutherm, 2004. (Year: 2004).*
"NPL—Design—VAV With Duct Heat Fm6p6r0504 2005.pdf", Duct Heat Subzoned With Therma-Fuser VAV Diffusers, Acutherm, 2005. (Year: 2005).*
"NPL—Guide—Building Automation System Fm010p112_REV_1402 2014.pdf", Building Automation Guide for Therma-Fuser Systems, Acutherm, 2014. (Year: 2014).*
"NPL—O&M—PIM—Fm30p2r0606.pdf", PIM Installation & Balancing, Acutherm, 2006. (Year: 2006).*
"NPL—Search—Archive_Org—Acutherm.pdf", Internet Archive Search, https://web.archive.org, 2020. (Year: 2020).*
International Search Report for PCT/EP2017/061840 dated Jul. 6, 2017 (PCT/ISA/210).
Written Opinion of the International Searching Authority for PCT/EP2017/061840 dated Jul. 6, 2017.
Swiss Search Report for 790/2016 dated Oct. 14, 2016.
English Translation of Office Action dated Apr. 7, 2020 in Chinese Application No. 201780038807.6.

* cited by examiner

METHOD AND DEVICES FOR CONTROLLING A FLUID TRANSPORTATION NETWORK

CROSS REFERENCE TO RELATED APPLICATIONS

This application is a National Stage of International Application No. PCT/PCT/EP2017/061840 filed May 17, 2017, claiming priority based on Swiss Patent Application No. 00790/16, filed Jun. 22, 2016.

FIELD OF THE INVENTION

The present invention relates to a method and devices for controlling a fluid transportation network. Specifically, the present invention relates to a fluid transportation network and to a method and devices for controlling the fluid transportation network, which comprises one or more network sections, whereby each network section is connected to a fluid transportation circuit through a respective supply line and comprises one or more parallel zones.

BACKGROUND OF THE INVENTION

Fluid transport systems typically comprise multiple consumers, meaning parallel branches or lines, through which a liquid or gaseous fluid is transported—for example to distribute thermal energy. The consumers typically have different designs, meaning that they have different diameters and/or lengths of the transport lines—for example, pipe conduits—and have different and/or varying flow volumes and/or throughput. In order to undertake a balanced and/or compensated distribution of the fluids to the consumers in such fluid transport systems, the consumers are each configured with a compensation- or balancing organ, for example an adjustable actuator, particularly a valve, which can set the flow through the respective consumer at different degrees of opening and/or valve positions.

A balancing method for a network for the distribution of a non-compressed liquid is described in DE 69706458, wherein for each branch, two pressure connection points are arranged on both sides of the compensating organ, and a further third pressure connection point is arranged at a distance therefrom. In all branches, flow measurements are carried out by measuring the difference in flow on both sides of the respective compensating organ, and a measurement of a pressure difference is carried out by means of the third pressure connection point. On the basis of these measured values, the hydraulic flow capacity coefficients of all branches and segments on the primary line are calculated. Finally, the adjustment positions of each compensating organ are calculated and set on the basis of knowledge of the desired flow in each branch and utilizing the specific flow capacity coefficients. The compensation method requires multiple pressure connection points for each compensating organ, and is not designed for a dynamic balancing of a fluid transport system.

EP 2 085 707 shows the hydraulic balancing of a heating system, wherein a heating element is equipped with a measuring device for measurement of the pressure and flow volume. Means are included for the detection of the flow volume as provided, as are means for detecting the pressure difference between the in-flow and the outlet flow. Means for the detection of the flow volume are arranged on the heating element, and serve the purpose of eliminating errors and automating the balancing. EP 0 795 724, which is in the same patent family as DE 69706458, shows substantially the same features as DE 69706458.

DE 199 12 588 shows a hydraulic system having multiple conduit lines. For the purpose of improving the regulating behavior, valves with an electronic flow volume measuring device and an actuator drive are arranged in both a primary circuit and in the conduit lines of the consumer circuits.

EP 2 157 376 shows an arrangement for hydraulically balancing a system for the purpose of cooling or heating. The system has an in-flow line, an outlet flow line, a throttle device, and a measuring device for a flow volume. Valves are included in each line for the purpose of hydraulic balancing, and measuring means are included for the purpose of determining the flows into the individual lines.

U.S. Pat. No. 8,024,161 describes a method and system for optimal model-based multivariable balancing for distributed fluid transportation networks based on global differential pressure/flow rate information. U.S. Pat. No. 8,024,161 uses a simplified mathematical model of a fluid transportation network and a set of measured flow values in all the zones of the fluid transportation network to identify unknown network parameters. According to U.S. Pat. No. 8,024,161, valve settings are balanced by calculating the sum of pressure drops across the balancing valves and by solving an optimization problem to minimize the sum of pressure drops across the balancing valves in a non-iterative approach.

In these prior art systems, a separate sensor is included in each consumer for the purpose of determining the flow. As a result, a great degree of complexity is particularly inherent in the installation process.

SUMMARY OF THE INVENTION

It is an object of this invention to provide a fluid transportation network and a method and devices for controlling the fluid transportation network, which fluid transportation network, method and devices do not have at least some of the disadvantages of the prior art.

According to the present invention, these objects are achieved through the features of the independent claims. In addition, further advantageous embodiments follow from the dependent claims and the description.

A fluid transportation network comprises one or more network sections. Each network section is connected to a fluid transportation circuit through a respective supply line and comprises one or more parallel zones.

According to the present invention, the above-mentioned objects are particularly achieved in that for controlling the fluid transportation network, a pressure invariant regulating system is arranged in in each of the zones to implement each of the zones as a pressure independent branch of the respective network section. A pressure regulating device is arranged in the supply lines or respective return lines of each of the network sections. A first processing unit controls the pressure regulating devices of each of the network sections to operate the pressure independent branches of the respective network section within a specified pressure range, defined by device specifications of the pressure invariant regulating system in each of the zones. For example, the device specifications define a specific operating pressure range, e.g. a specific operating pressure range of a mechanical pressure independent valve or an operating pressure range of a sensor used in the pressure invariant regulating system.

In an embodiment, a second processing unit determines and sets a level of pumping power for a pump of the fluid transportation circuit, depending on current operating parameters of the pressure regulating devices arranged in the respective supply lines or return lines of the network sections.

In an embodiment, the pressure invariant regulating systems are each implemented as a regulating zone valve in each zone for regulating a flow of fluid through the respective zone. The pressure regulating devices are each implemented as a line valve arranged in the respective supply lines or return lines of the network sections. The first processing unit receives valve positions of the regulating zone valves. The first processing unit determines and sets an adjusted valve position for a line valve arranged in the supply line or a respective return line, depending on the valve positions of the regulating zone valves. By controlling the line valve depending on the valve positions of the regulating zone valves, it is possible to adjust the pressure in the supply (and return line) and, thus, the differential pressure over regulating zone valves.

In an embodiment, determining the adjusted valve position for the line valve comprises determining whether the valve position of the regulating zone valve that is opened most is within defined lower and upper opening limits. The adjusted valve position for the line valve is set to a value representative of a more open setting, if the valve position of the regulating zone valve that is opened most is above the upper opening limit. The adjusted valve position for the line valve is set to a value representative of a more closed setting, if the valve position of the regulating zone valve that is opened most is below the lower opening limit. By controlling the line valve depending on the valve positions of the regulating zone valves, the valve positions of the regulating zone valves can be maintained within a preferred range where the target flows are obtained more efficiently with respect to the required pumping energy, as less energy is used unnecessarily to overcome obstacles of valves which are barely open.

In an embodiment, the regulating zone valves are implemented as six-way valves configured to couple a respective zone alternatively to a first fluid transportation circuit for heating or to a second fluid transportation circuit for cooling, and to regulate the flow of fluid from the first or second fluid transportation circuit, respectively, through the zone. The first processing unit receives valve positions of the six-way regulating zone valves. The first processing unit calculates and sets an adjusted valve position for a valve arranged in a supply line or a respective return line of the first fluid transportation circuit and an adjusted valve position for a line valve arranged in a supply line or a respective return line of the second fluid transportation circuit, depending on the valve positions of the six-way regulating zone valves. Consequently, the advantages of reduced hardware overhead, by having to merely measure the flow of fluid in the supply lines, and increased energy efficiency in fluid transport, by maintaining the valve positions of the regulating zone valves in a preferred range, can be extended to dual transportation circuits where separate supply lines are used for cooling and heating.

In an embodiment, the fluid transportation network comprises a plurality of network sections. Each network section is connected to a fluid transportation circuit through a supply line and a line valve arranged in the respective supply line or return line. A second processing unit receives valve positions of the line valves arranged in the respective supply lines or return lines. The second processing unit determines and sets a level of pumping power for a pump of the fluid transportation circuit, depending on the valve positions of the line valves arranged in the respective supply line or return line. Thus, the usage of pumping power can be controlled more efficiently in the fluid transportation network across several network sections with a plurality of zones.

In an embodiment, a third processing unit receives a measurement of a total flow of fluid through the supply line. The third processing unit determines and sets adjusted valve positions for the regulating zone valves, depending on the measurement of the total flow of fluid and a total of target flows for the zones. Using only one common flow sensor for measuring the flow the supply line, it is possible to regulate the fluid transportation network by controlling the valve in the supply or return line, depending on valve positions of the regulating zone valves, and controlling the regulating zone valves, depending on the flow resulting in the supply or return line.

In an embodiment, determining the adjusted valve position for the regulating zone valves comprises performing a dynamic balancing of the zones by setting the valve positions of the regulating zone valves based on the target flows for the zones and the total flow of fluid through the supply line, using characteristic valve data of the regulating zone valves which define valve positions for the corresponding regulating zone valve for a specific target flow. By controlling the regulating zone valves depending on the flow through the common supply line, it is possible to balance the regulating zone valves using just one common flow sensor for measuring the flow in the supply line.

In an embodiment, a fourth processing unit detects and attenuates oscillation in one or more control or feedback signals of the fluid transportation network, the control or feedback signals of the fluid transportation network including: current valve positions of the regulating zone valves, set points for adjusted valve positions of the regulating zone valves, current valve positions of the line valve, set points for adjusted valve positions of the line valve, and/or current total flow of fluid through the supply line.

In addition to a method of controlling a fluid transportation network, the present invention also relates to a fluid transportation network; specifically, a fluid transportation network that comprises one or more network sections, each network section being connected to a fluid transportation circuit through a respective supply line and comprising one or more parallel zones. The fluid transportation network further comprises pressure invariant regulating systems arranged in each of the zones and configured to implement each of the zones as a pressure independent branch of the respective network section. A pressure regulating device is arranged in the supply lines or respective return lines of each of the network sections. A first processing unit is configured to control the pressure regulating devices of each of the network sections to operate the pressure independent branches of the respective network section within a specified pressure range, defined by device specifications of the pressure invariant regulating system in each of the zones.

In an embodiment, the fluid transportation network further comprises a pump arranged in the fluid transportation circuit. The second processing unit is configured to determine and set a level of pumping power for the pump of the fluid transportation circuit, depending on current operating parameters of the pressure regulating devices arranged in the respective supply lines or return lines of the network sections.

In an embodiment, the pressure invariant regulating systems are each implemented as a regulating zone valve in each zone for regulating a flow of fluid through the respective zone. The pressure regulating devices are each implemented as a line valve arranged in the respective supply lines or return lines of the network sections. The first processing unit is configured to receive valve positions of the regulating zone valves, and to determine and set, depending on the valve positions of the regulating zone valves, an adjusted valve position for a line valve arranged in the supply line or a respective return line.

In an embodiment, the first processing unit is configured to determine the adjusted valve position for the line valve by determining whether the valve position of the regulating zone valve that is opened most is within defined lower and upper opening limits, setting the adjusted valve position for the line valve to a value representative of a more open setting, if the valve position of the regulating zone valve that is opened most is above the upper opening limit, and setting the adjusted valve position for the line valve to a value representative of a more closed setting, if the valve position of the regulating zone valve that is opened most is below the lower opening limit.

In an embodiment, the regulating zone valves are implemented as six-way valves configured to couple a respective zone alternatively to a first fluid transportation circuit for heating or to a second fluid transportation circuit for cooling, and to regulate the flow of fluid from the first or second fluid transportation circuit, respectively, through the zone. The first processing unit is configured to receive valve positions of the six-way regulating zone valves, and to calculate and set, depending on the valve positions of the six-way regulating zone valves, an adjusted valve position for a valve arranged in a supply line or a respective return line of the first fluid transportation circuit and an adjusted valve position for a line valve arranged in a supply line or a respective return line of the second fluid transportation circuit.

In an embodiment, the fluid transportation network comprises a plurality of network sections and the second processing unit is configured to receive valve positions of the line valves arranged in the respective supply line or return line, and to determine and set a level of pumping power for a pump of the fluid transportation circuit, depending on the valve positions of the line valves arranged in the respective supply line or return line.

In an embodiment, the fluid transportation network comprises a third processing unit configured to receive a measurement of a total flow of fluid through the supply line, and to determine and set, depending on the measurement of the total flow of fluid through the supply line and a total of target flows for the zones, adjusted valve positions for the regulating zone valves of the zones.

In an embodiment, the third processing unit is configured to determine the adjusted valve positions for the regulating zone valves by performing a dynamic balancing of the zones by setting the valve positions of the regulating zone valves based on the target flows for the zones and the total flow of fluid through the supply line, using characteristic valve data of the regulating zone valves which define valve positions for the corresponding regulating zone valve for a specific target flow.

In an embodiment, the first processing unit is arranged in a controller of the line valve arranged in a supply line or a respective return line, and the first processing unit is configured to receive the valve positions from controllers of the regulating zone valves.

In an embodiment, the third processing unit is arranged in a controller of the line valve, and the third processing unit is configured to transmit the adjusted valve positions to controllers of the regulating zone valves.

In an embodiment, the fluid transportation network further comprises a fourth processing unit configured to detect and attenuate oscillation in one or more control or feedback signals of the fluid transportation network. The control or feedback signals of the fluid transportation network include current valve positions of the regulating zone valves, set points for adjusted valve positions of the regulating zone valves, current valve positions of the line valve, set points for adjusted valve positions of the line valve, and/or current total flow of fluid through the supply line.

In addition to a method of controlling a fluid transportation network and a fluid transportation network, the present invention also relates to a processing device for controlling the fluid transportation network. The device comprises a processing unit configured to receive valve positions of the regulating zone valves, and to determine and set an adjusted valve position for a line valve arranged in the supply line or respective return line, depending on the valve positions of the regulating zone valves.

In an embodiment, the processing unit is further configured to receive a measurement of a total flow of fluid through the supply line, and to determine and set adjusted valve positions for the regulating zone valves, depending on the measurement of the total flow of fluid through the supply line and a total of target flows for the zones.

In an embodiment, the processing unit is configured to determine the adjusted valve position for the line valve arranged in the supply line or respective return line by determining whether the valve position of the regulating zone valve that is opened most is within defined lower and upper opening limits. If the valve position of the regulating zone valve that is opened most is above the upper opening limit, the adjusted valve position for the line valve is set to a value representative of a more open setting. If the valve position of the regulating zone valve that is opened most is below the lower opening limit, the adjusted valve position for the line valve is set to a value representative of a more closed setting.

In an embodiment, the processing unit is configured to determine the adjusted valve positions for the regulating zone valves by performing a dynamic balancing of the zones. The valve positions of the regulating zone valves are set based on the target flows for the zones and the total flow of fluid through the supply line, using characteristic valve data of the regulating zone valves which define valve positions for the corresponding regulating zone valve for a specific target flow.

In an embodiment, the regulating zone valves are implemented as six-way valves configured to couple a respective zone alternatively to a first fluid transportation circuit for heating or to a second fluid transportation circuit for cooling, and to regulate the flow of fluid from the first or second fluid transportation circuit, respectively, through the zone. The processing unit is configured to receive valve positions of the six-way regulating zone valves, to determine and set an adjusted valve position for a line valve arranged in a supply line or return line of the first fluid transportation circuit and an adjusted valve position for a line valve arranged in a supply line or return line of the second fluid transportation circuit, depending on the valve positions of the six-way regulating zone valves.

In an embodiment, the fluid transportation network comprises a plurality of network sections. Each network section is connected to a fluid transportation circuit through a supply line and a line valve arranged in the respective supply line or return line. The processing unit is configured to receive valve positions of the line valves arranged in the respective supply line or return line, and to determine and set a level of pumping power for a pump of the fluid transportation circuit, depending on the valve positions of the line valves arranged in the respective supply line or return line.

In an embodiment, the processing unit is further configured to detect and attenuate oscillation in one or more control or feedback signals of the fluid transportation network, the control or feedback signals of the fluid transportation network including: current valve positions of the regulating zone valves, set points for adjusted valve positions of the regulating zone valves, current valve positions of the line valve, set points for adjusted valve positions of the line valve, and/or current total flow of fluid through the supply line.

In addition to a method and devices for controlling a fluid transportation network, the present invention also relates to a computer program product for controlling one or more processors for controlling a fluid transportation network that comprises a plurality of parallel zones, fed by a common supply line, with a regulating zone valve in each zone for regulating a flow of fluid through the respective zone, such that the one or more processors receive valve positions of the regulating zone valves, and determine and set an adjusted valve position for a line valve arranged in the supply line or a respective return line, depending on the valve positions of the regulating zone valves.

In an embodiment, the computer program code is further configured to control the one or more processors such that the one or more processors receive a measurement of a total flow of fluid through the supply line, and determine and set adjusted valve positions for the regulating zone valves, depending on the measurement of the total flow of fluid through the supply line and a total of target flows for the zones.

In an embodiment, the computer program code is configured to control the one or more processors such that the one or more processors determine the adjusted valve position for the line valve arranged in the supply line or return line by determining whether the valve position of the regulating zone valve that is opened most is within defined lower and upper opening limits; setting the adjusted valve position for the line valve to a value representative of a more open setting, if the valve position of the regulating zone valve that is opened most is above the upper opening limit; and setting the adjusted valve position for the line valve to a value representative of a more closed setting, if the valve position of the regulating zone valve that is opened most is below the lower opening limit.

In an embodiment, the computer program code is configured to control the one or more processors such that the one or more processors determine the adjusted valve positions for the regulating zone valves by performing a dynamic balancing of the zones by setting the valve positions of the regulating zone valves based on the target flows for the zones and the total flow of fluid through the supply line, using characteristic valve data of the regulating zone valves which define valve positions for the corresponding regulating zone valve for a specific target flow.

In an embodiment, the computer program code is configured to control the one or more processors such that the one or more processors detect and attenuate oscillation in one or more control or feedback signals of the fluid transportation network, the control or feedback signals of the fluid transportation network including: current valve positions of the regulating zone valves, set points for adjusted valve positions of the regulating zone valves, current valve positions of the line valve, set points for adjusted valve positions of the line valve, and/or current total flow of fluid through the supply line.

In further embodiments, the computer program code is configured to control the one or more processors such that the one or more processors implement further embodiments of the method described above.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
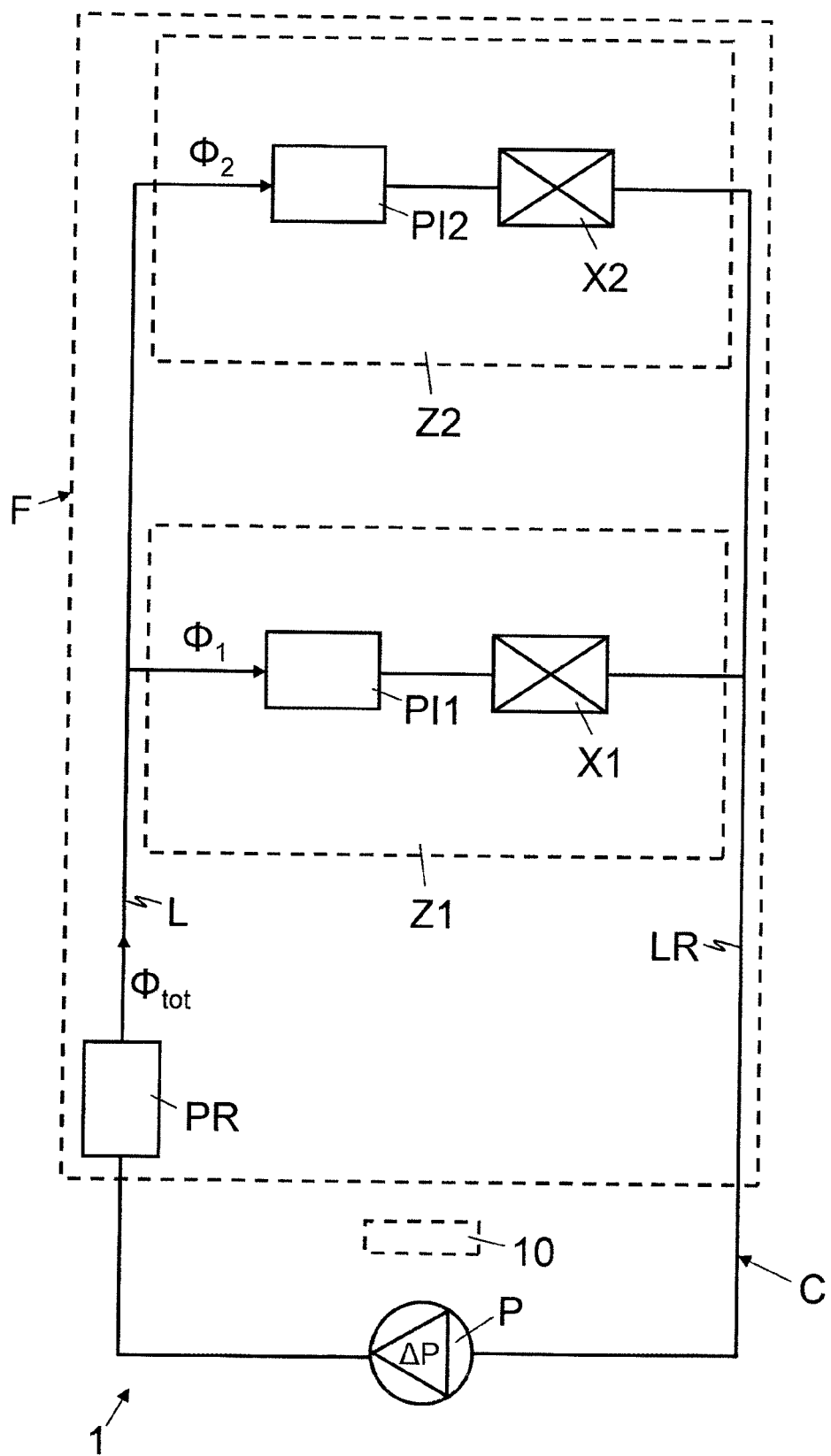
FIG. 1: shows a block diagram illustrating schematically an example of simple fluid transportation network, comprising a fluid transportation circuit with a pump and a network section that is connected to the fluid transportation circuit through a supply line and a pressure regulating device, and comprises two zones with a pressure invariant regulating system and a thermal exchanger in each zone.
Figure 2:
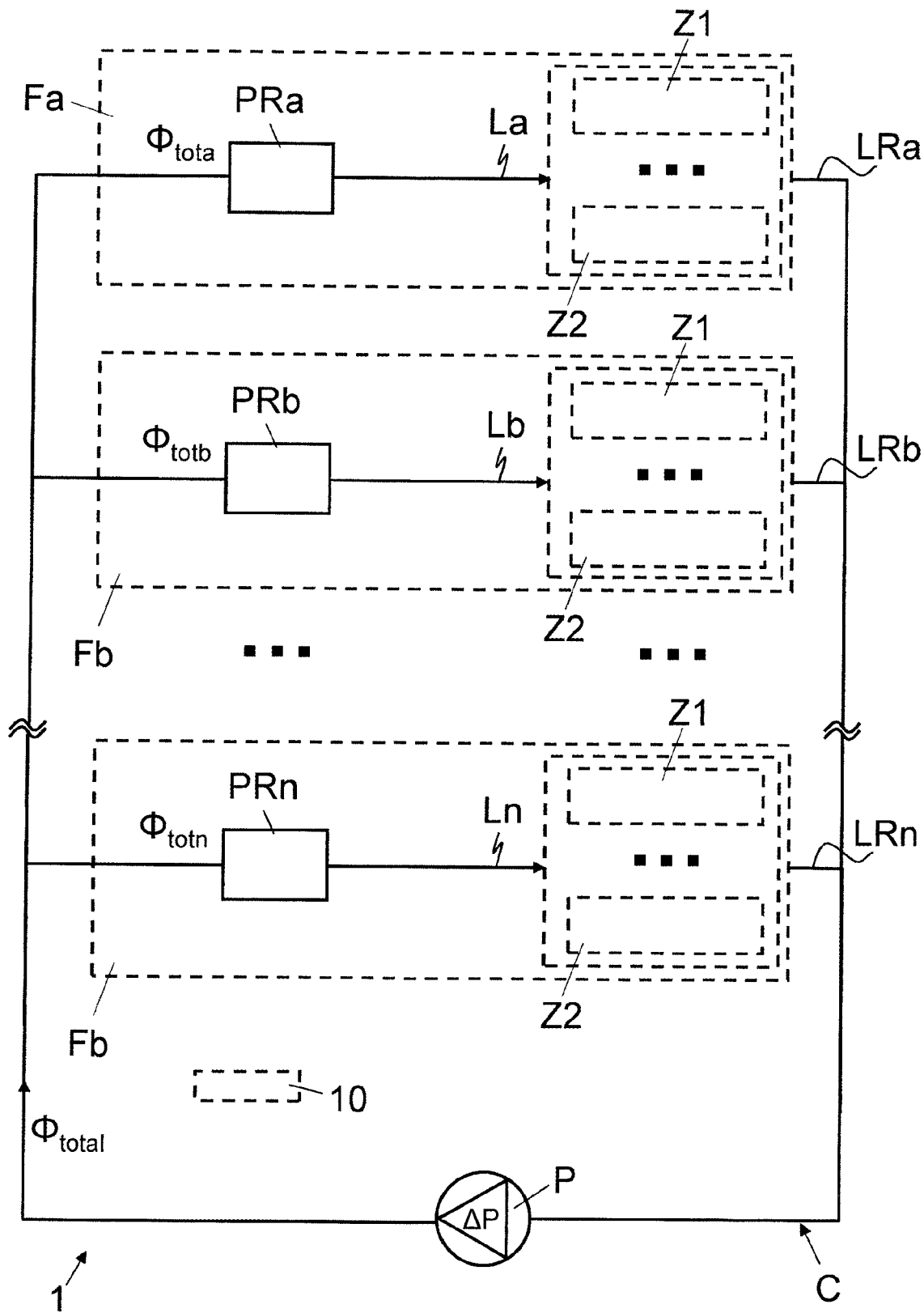
FIG. 2: shows a block diagram illustrating schematically a fluid transportation network, comprising a fluid transportation circuit with a pump and several network sections, each of the network sections having one or more zones and being connected to the fluid transportation circuit through a supply line and a pressure regulating device.
Figure 3:
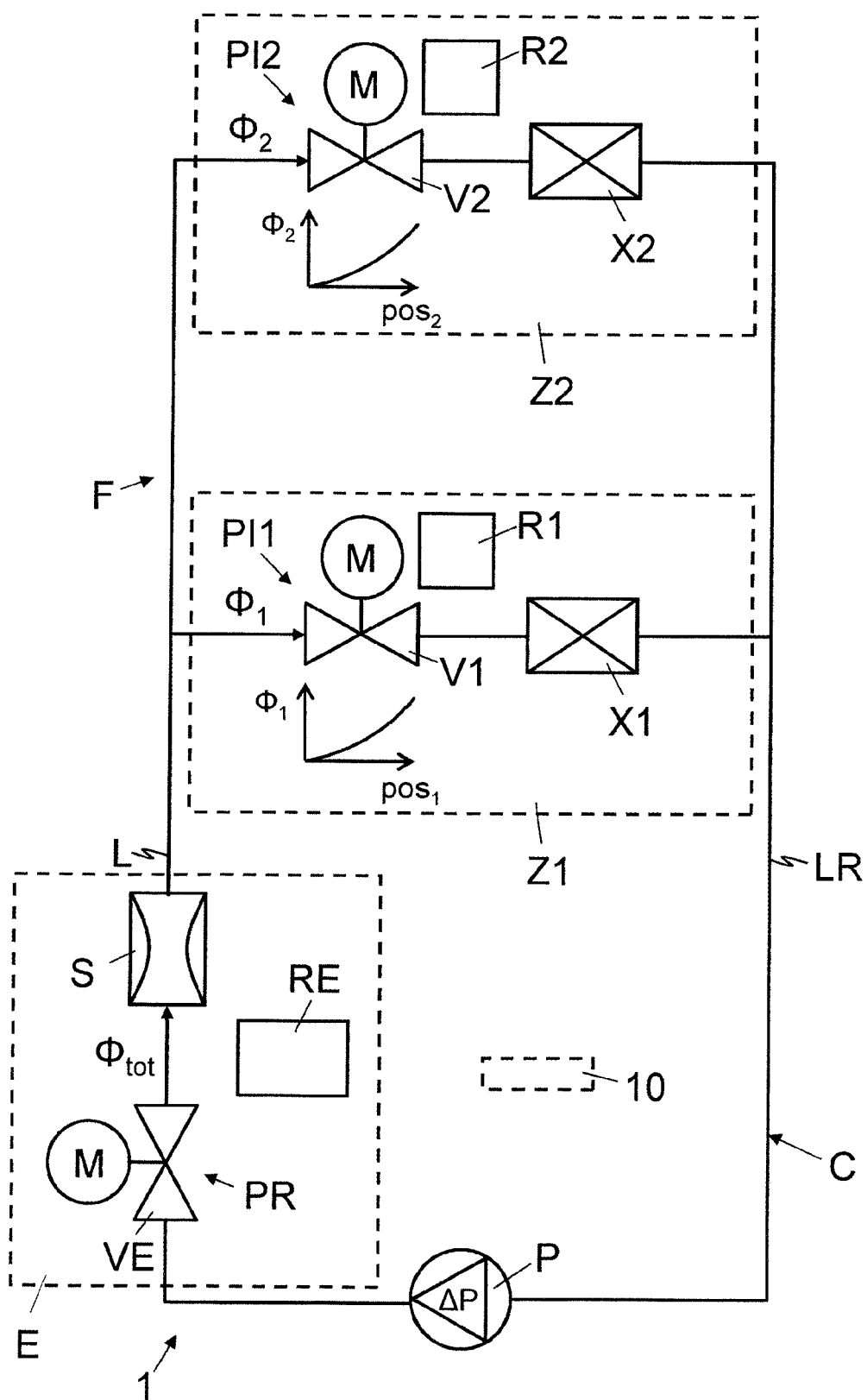
FIG. 3: shows a block diagram illustrating schematically an example of simple fluid transportation network, comprising a fluid transportation circuit with a pump and a network section that is connected to the fluid transportation circuit through a supply line and a valve, and comprises two zones with a regulating zone valve and a thermal exchanger in each zone.
Figure 4:
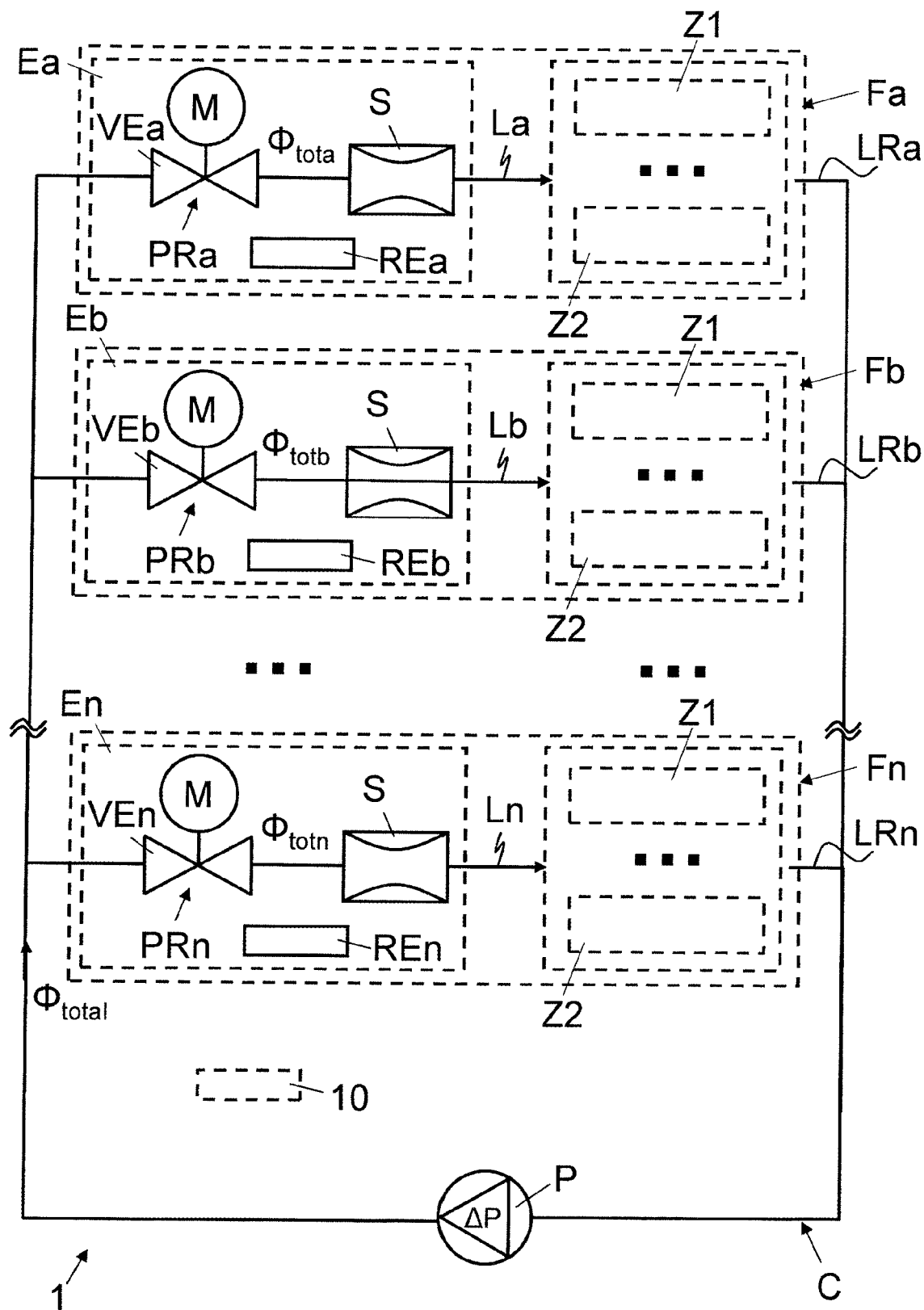
FIG. 4: shows a block diagram illustrating schematically a fluid transportation network, comprising a fluid transportation circuit with a pump and several network sections, each of the network sections being connected to the fluid transportation circuit through a supply line and a valve.
Figure 5:
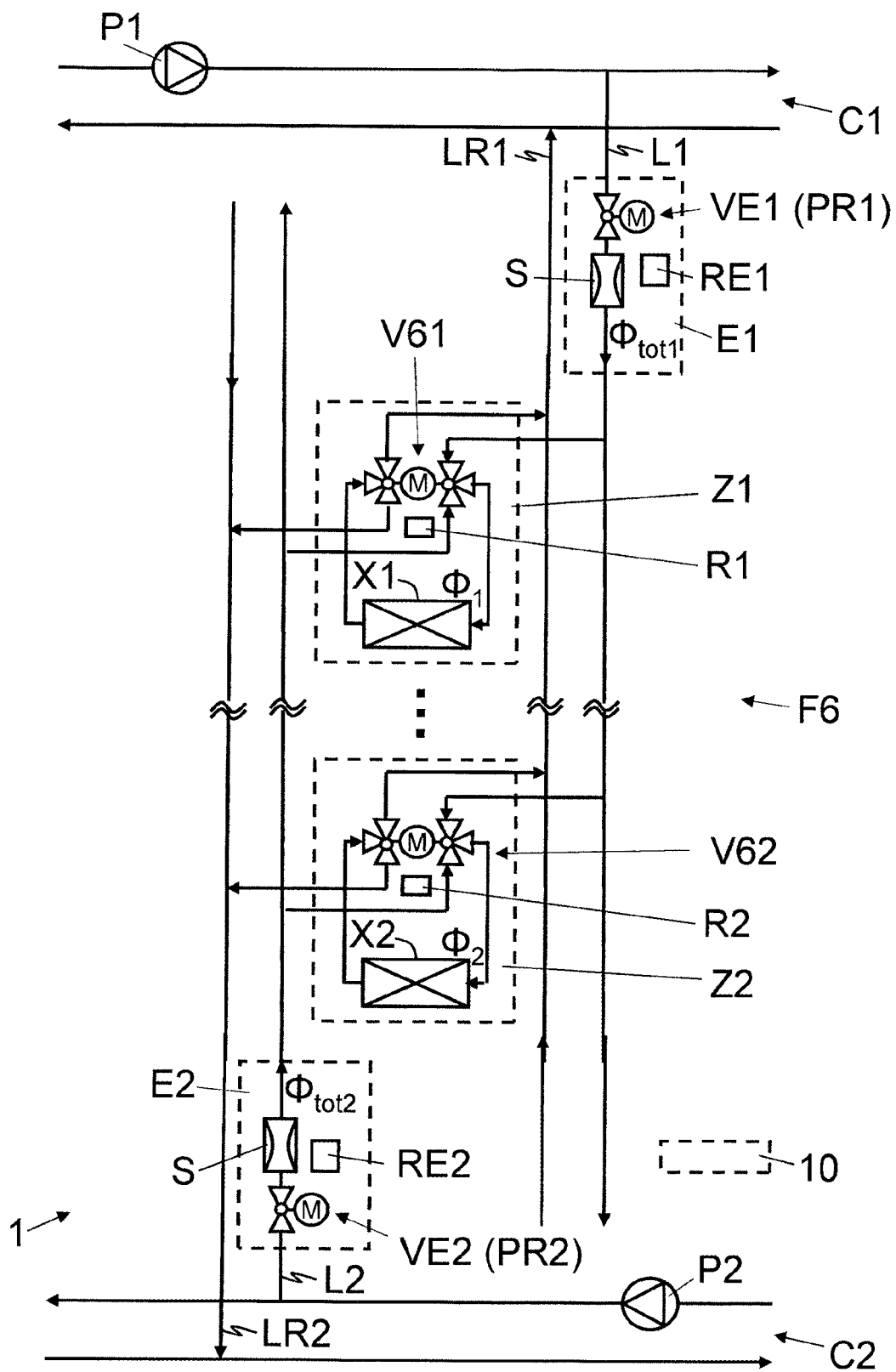
FIG. 5: shows a block diagram illustrating schematically an example of a fluid transportation network comprising two fluid transportation circuits with a pump in each of them, and a network section that comprises several zones with a thermal exchanger in each zone that is connectable alternatively to one the fluid transportation circuits through six way regulating valves.

In FIGS. 1 to 5, reference numeral 1 refers to a fluid transportation network, e.g. a hydraulic or hydronic network, which comprises a plurality of parallel zones Z1, Z2. The fluid transportation network 1 includes one or more fluid transportation circuits C, C1, C2 with fluid transportation lines, e.g. pipes, for transporting a liquid heat transportation medium, e.g. water. As illustrated schematically in FIGS. 1, 3 and 5, each of the zones Z1, Z2 comprises one or more thermal energy exchangers X1, X2, e.g. a heat exchanger for heating the zone Z1, Z2 or a cooling device for cooling the zone Z1, Z2. As indicated in FIGS. 1 and 3, for implementing the zones Z1, Z2 as pressure independent branches, the zones Z1, Z2 further comprise a pressure invariant regulating system PI1, PI2. The pressure invariant regulating systems PI1, PI2 are each implemented as a regulating zone valve V1, V2, V61, V62 for regulating the flow of fluid $\phi_1$, $\phi_2$ through the respective zone Z1, Z2 or thermal energy exchanger X1, X2, respectively. Depending on the embodiment and/or configuration, the regulating zone valves V1, V2, V61, V62 are implemented as mechanical pressure independent valves, as electronic pressure independent valves (including individual flow sensors and controllers as illustrated in FIGS. 3, 4, and 5), or as several motorized valves which are connected to a common controller and a common flow sensor as disclosed by the Applicant in patent applications WO2013/000785 or WO2014/094991. As shown in FIGS. 1 to 5, the fluid transportation network 1 further includes in the fluid transportation circuits C, C1, C2 a common source or drive, e.g. a motorized pump P, P1, P2, for moving the fluid through the fluid transportation circuits C, C1, C2 of the fluid transportation network 1.

It should be noted that the fluid transportation network 1 shown in FIGS. 1 and 3 is highly simplified and in actual configurations comprises more than two zones Z1, Z2.

As illustrated in FIGS. 2 and 4, the fluid transportation network 1 typically comprises more than one network sections Fa, Fb, . . . , Fn connected to the fluid transportation circuit C. For example, each network section Fa, Fb, . . . , Fn corresponds to and covers a floor in a building. As indicated schematically in FIGS. 1 to 5, each of the network sections F, Fa, Fb, . . . , Fn, F6 comprises one or more zones Z1, Z2 which are illustrated in more detail in FIGS. 1, 3 and 5. As further illustrated in FIGS. 1 to 5, each network section F, Fa, Fb, . . . , Fn, F6 is connected to the respective fluid transportation circuit C, C1, C2 via a supply line L, La, Lb, . . . , Ln, L1, L2, i.e. a fluid transportation line connecting the network sections F, Fa, Fb, . . . , Fn, F6 and their zones Z1, Z2 (and thermal energy exchangers) to the respective fluid transportation circuit C, C1, C2.

As illustrated in FIGS. 1 to 5, for dynamically ensuring that the pressure independent branches or zones Z1, Z2, respectively, of the network sections F, Fa, Fb, . . . , Fn, F6 operate within a specified pressure range, pressure regulating devices PR, PRa, PRb, . . . , PRn, PR1, PR2 are arranged in the respective supply lines L, La, Lb, . . . , Ln, L1, L2 connecting the pressure independent branches or zones Z1, Z2 of a network section F, Fa, Fb, . . . , Fn, F6 to the respective fluid transportation circuit C, C1, C2. Depending on the embodiment and/or configuration, the pressure regulating devices PR, PRa, PRb, . . . , PRn, PR1, PR2 are implemented as controllable line valves VE, VEa, VEb, . . . , VEn, VE1, VE2, as illustrated in FIGS. 3 to 5, or as a network section drive, e.g. a motorized network section pump or ventilator, respectively (not illustrated). The specific pressure range targeted for the pressure independent branches or zones Z1, Z2, respectively, are defined by device specifications of the pressure invariant regulating system PI1, PI2 in each of the zones Z1, Z2. Specifically, the specific pressure range is determined based on the specified operating range for the flow sensors used in the regulating zone valves V1, V2, V61, V62 and/or the specified operating pressure range of the regulating zone valves V1, V2, V61, V62. As illustrated in FIGS. 3, 4, and 5, for controlling the flow of fluid $\phi_{tot}$, $\phi_{tota}$, $\phi_{totb}$, . . . , $\phi_{totn}$, $\phi_{tot1}$, $\phi_{tot2}$ through a supply line L, La, Lb, . . . , Ln, L1, L2 to a network section F, Fa, Fb, . . . , Fn, F6, the controllable line valves VE, VEa, VEb, . . . , VEn, VE1, VE2 are arranged in the respective supply line L, La, Lb, . . . , Ln, L1, L2. The actual current flow of fluid (flow rate) is measured by way of a flow sensor S arranged in the respective supply line L, La, Lb, . . . , Ln, L1, L2, e.g. an ultrasound flow sensor, or another type of flow sensor.

One skilled in the art will understand that in an alternative configuration, the controllable line valves VE, VEa, VEb, . . . , VEn, VE1, VE2 and/or the flow sensors S can be arranged in a respective (common) return line LR, LRa, LRb, . . . , LRn, LR1, LR2, with the same result as described in the following paragraphs for line valves VE, VEa, VEb, . . . , VEn, VE1, VE2 and sensors S arranged in a respective supply line L, La, Lb, . . . , Ln, L1, L2.

As illustrated schematically in FIGS. 3, 4, and 5, the regulating zone valves V1, V2, V61, V62 and the controllable line valves VE, VEa, VEb, . . . , VEn, VE1, VE2 are driven by (electric) motors M for adjusting the orifice and, thus, the flow of fluid through the valve. The motors M are controlled by processing units R1, R2, RE, REa, REb, . . . , REn, RE1, RE2 that are connected electrically or electromagnetically to the respective motor M. The processing units R1, R2, RE, REa, REb, . . . , REn, RE1, RE2 are processing devices that each include an electronic circuit, e.g. a programmable processor, an application specific integrated circuit (ASIC), or another logic unit configured to control a motor M. Thus, these processing units R1, R2, RE, REa, REb, . . . , REn, RE1, RE2 may also be referred to as "controller". For example, a motor M and a processing unit (or controller) R1, R2, RE, REa, REb, . . . , REn, RE1, RE2 form an actuator in a common actuator housing. The actuators or processing units R1, R2, RE, REa, REb, . . . , REn, RE1, RE2, respectively, further comprise a communication module configured for wireless and/or wired data communication with external processing devices, e.g. another processing unit (or controller) R1, R2, RE, REa, REb, . . . , REn, RE1, RE2, a computerized processing unit 10 operating as a fluid transportation network controller, or another computer or communication device, e.g. a cloud-based computer system, a mobile telephone, or a tablet computer, etc. The processing units R1, R2, RE, REa, REb, . . . , REn, RE1, RE2 and the fluid transportation network controller 10 are configured (programmed) to perform various functions described later in more detail.

In an embodiment, the controllable line valves VE, VEa, VEb, . . . , VEn, VE1, VE2 and their respective processing units or controllers RE, REa, REb, . . . , REn, RE1, RE2 are coupled to a flow sensor S to form an electronic pressure invariant valve (EPIV) E, Ea, Eb, . . . , En, E1, E2.

FIG. 5 illustrates a configuration where the regulating zone valves are implemented as six-way valves V61, V62. The six way regulating valves V61, V62 comprise two three-way valves which are actuated by one motor M, such that the respective zone Z1, Z2 or the respective thermal energy exchanger X1, X2 is connectable (and controllable) alternatively to one of two fluid transportation circuits C1, C2 via supply line L1 or L2, respectively. One of the fluid transportation circuits C1 carries a heated fluid for heating the zones Z1, Z2; whereas, the other one of the fluid transportation circuits C2 carries a cooled fluid for cooling the zones Z1, Z2. While one of the two fluid transportation circuits C1, C2 is closed off from the respective zone Z1, Z2 by the six way regulating valve V61, V62, the other one of the two fluid transportation circuits C1, C2 is connected to the respective zone Z1, Z2 by the six way regulating valve V61, V62 and the flow $\phi_1$, $\phi_2$ from the connected fluid transportation circuit C1, C2 through the respective zone Z1, Z2 or its thermal energy exchanger X1, X2, respectively, is determined by the setting of the valve position of the six way regulating valves V61, V62.

While FIG. 5 illustrates a configuration of the fluid transportation network 1 using six-way valves V61, V62 and a four-pipe system to switch individual zones Z1, Z2 between either heating or cooling; in an alternative configuration (no illustrated), three-way valves and a three-pipe system are used to switch a network of multiple zones Z1, Z2 (multi-zone network) between all heating and all cooling.

In the following paragraphs, a sequence of steps for controlling the fluid transportation network 1 is described with reference to FIGS. 6, 7, 8, and 9. It should be pointed out that these steps can be executed in various configurations by one or more of the processing units (or controllers) R1, R2, RE, REa, REb, . . . , REn, RE1, RE2 associated with the respective actuator or valve, by a computerized fluid transportation network controller 10, or by a cloud-based computer system. For the sake of clarity, in the following paragraphs, a distinction is made between:

a first processing unit, referred to as "optimizer processing unit", which is configured to determine and set adjusted valve positions for the controllable line valves VE, VEa, VEb, . . . , VEn, VE1, VE2;

a second processing unit, referred to as "power processing unit", which is configured to determine and set adjusted levels of pumping power for the pumps P, P1, P2;

a third processing unit, referred to as "multi-zone processing unit", which is configured to determine and set adjusted valve positions for the regulating zone valves V1, V2, V61, V62; and a fourth processing unit, referred to as "filter processing unit", which is configured to detect and attenuate undesirable oscillation in the fluid transportation network 1.

Nevertheless, depending on the configuration the first, second, third, and fourth processing units can be implemented in the same electronic circuit or in different separate electronic circuits, e.g. in the same processor or in different separate processors, e.g. of the same or of different separate controllers RE, REa, REb, REn, RE1, RE2 or computers 10, and arranged as a functional module with one or more of the line valves VE, VEa, VEb, . . . , VEn, VE1, VE2 and/or a separate fluid transportation network controller 10 or another computer or communication device. Data communication between and among the processing units (or controllers) R1, R2, RE, REa, REb, . . . , REn, RE1, RE2, flow and/or pressure sensors, valves and pumps is performed via wired or wireless communication networks and/or communication busses.

Figure 6:
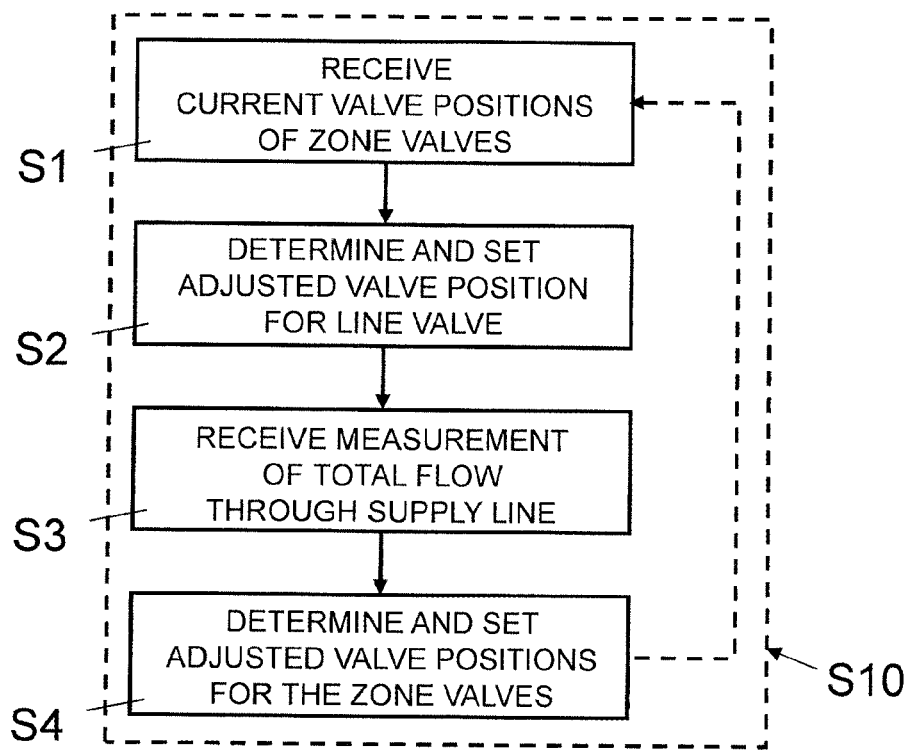
FIG. 6: shows a flow diagram illustrating an exemplary sequence of steps for controlling a fluid transportation network that comprises a plurality of parallel zones, by adjusting the valve positions of regulating zone valves in each zone.

As indicated schematically in FIG. 6 by reference numeral S10, the optimizer processing unit controls the pressure regulating devices PR, PRa, PRb, PRn, PR1, PR2 of each of the network sections F, Fa, Fb, Fn, F6 such that the pressure independent branches (formed by the zones Z1, Z2 and their pressure invariant regulating systems PI1, PI2) of the respective network section F, Fa, Fb, Fn, F6 are operated within a specified pressure range. As outlined above, the specific pressure range is defined by device specifications of the pressure invariant regulating system PI1, PI2 in each of the zones Z1, Z2, for example, the specified operating range for the flow sensors used in the regulating zone valves V1, V2, V61, V62 and/or the specified operating pressure range of the regulating zone valves V1, V2, V61, V62 (for example, a mechanical pressure independent valve has a specified pressure range in which it will function as designed and marketed. Outside of this specified pressure range, the valve will not behave as a pressure independent valve.). For maintaining a specific pressure range for the pressure independent branches, the optimizer processing unit controls the pressure regulating devices PR, PRa, PRb, PRn, PR1, PR2 depending on current operating parameters of the pressure invariant regulating systems PI1, PI2 in each of the zones Z1, Z2 of the network sections F, Fa, Fb, Fn, F6. Depending on the embodiment and/or configuration, the current operating parameters of the pressure invariant regulating systems PI1, PI2 include measured flow rates, pressure values, and/or valve positions of the regulating zone valves V1, V2, V61, V62. For example, maintaining a specified pressure range for the pressure independent branches is based on measured flow or pressure values (using flow or pressure sensors) in the supply lines L, La, Lb, Ln, L1, L2, e.g. in the case of pressure invariant regulating systems PI1, PI2 being implemented using mechanical pressure independent valves as regulating zone valve V1, V2 or in case of decentralized pumps in the zones Z1, Z2. Alternatively, e.g. in an embodiment and/or configuration with motorized regulating zone valves V1, V2, the specified pressure range is maintained based on current valve positions of the regulating zone valves V1, V2. For example, in an implementation with flow sensors, the optimizer processing unit receives a measurement of the total flow $\phi_{tot}$, $\phi_{tota}$, $\phi_{totb}$, . . . , $\phi_{totn}$, $\phi_{tot1}$, $\phi_{tot2}$ through the supply line L, La, Lb, Ln, L1, L2 to the respective network section F, Fa, Fb, Fn, F6 and compares this flow value to the sum of target flows through the zones Z1, Z2 or their regulating zone valves V1, V2, respectively. If there is a significant difference (e.g. a difference greater than a significance threshold of 25%), the optimizer processing unit determines that the regulating zone valves V1, V2 are operated outside their specified pressure range and, consequently, the optimizer processing unit controls the respective pressure regulating devices PR, PRa, PRb, PRn, PR1, PR2 to reduce the flow through the respective supply line L, La, Lb, Ln, L1, L2 (e.g. by reducing the opening or orifice of the line valves VE, VEa, VEb, . . . , VEn, VE1, VE2 in the respective supply line L, La, Lb, Ln, L1, L2, or by reducing the pumping power of a decentralized pump for the respective network section F, Fa, Fb, Fn, F6).

Figure 7:
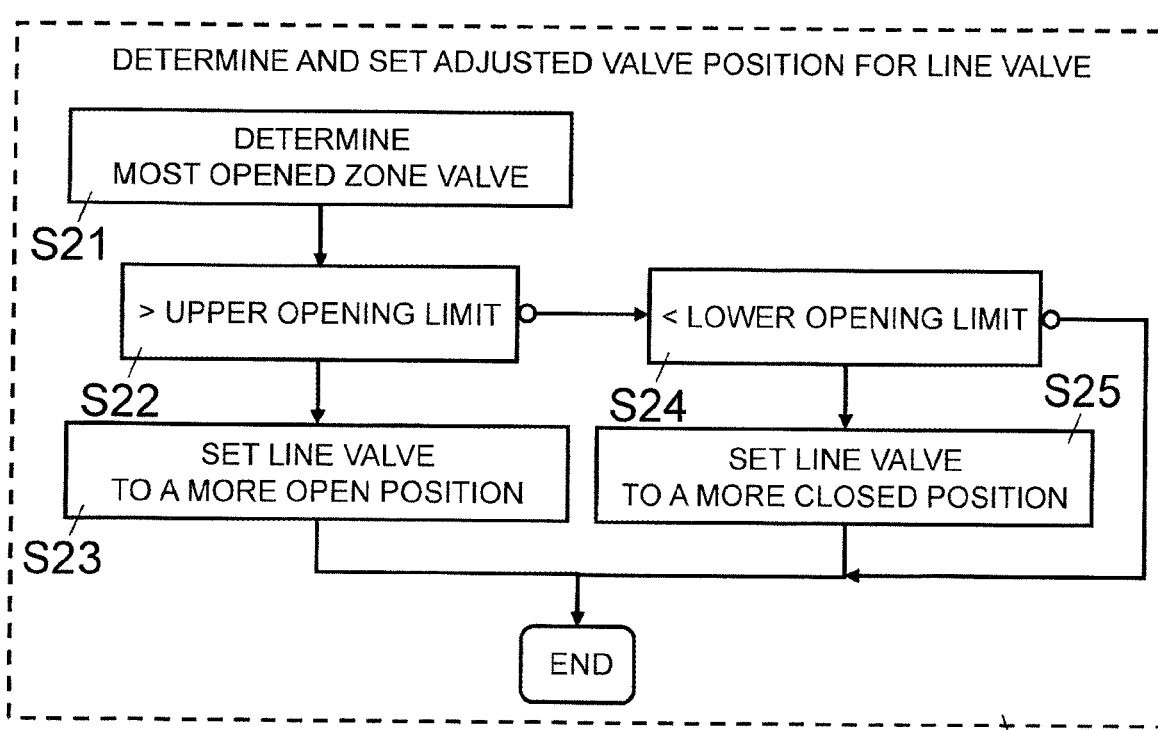
FIG. 7: shows a flow diagram illustrating an exemplary sequence of steps for adjusting the valve position of a line valve arranged in a supply line feeding the parallel zones of the fluid transportation network.

In the following paragraphs, described with reference to FIGS. 6 and 7 is a sequence of steps for maintaining a specific pressure range for the pressure independent branches based on current valve positions of the regulating zone valves V1, V2.

As illustrated in FIG. 6, in step S1, the optimizer processing unit receives the current valve positions $pos_1$, $pos_2$ of the regulating zone valves V1, V2, V61, V62. The current valve positions $pos_1$, $pos_2$ are reported by (push) or retrieved from (pull) the processing units (controllers) R1, R2 of the motors M of the regulating zone valves V1, V2, V61, V62 via a communication bus, a local area network (LAN), and/or a wireless LAN (WLAN), radio communication network (GSM, UMTS)) or communication interface, such as Bluetooth, RFID, NFC or the like. The valve positions $pos_1$, $pos_2$ include a numerical value, e.g. an angle or percentage, which indicates the degree of orifice or opening of a valve.

In step S2, the optimizer processing unit determines and sets adjusted valve positions for the line valves VE, VEa, VEb, ..., VEn, VE1, VE2 depending on the current valve positions $pos_1$, $pos_2$ of the regulating zone valves V1, V2, V61, V62.

As illustrated in FIG. 7, in step S21, the optimizer processing unit determines the most opened regulating zone valve V1, V2, V61, V62, i.e. the regulating zone valve V1, V2, V61, V62 that has currently the largest orifice or opening, as indicated by the respective current valve position $pos_1$, $pos_2$.

In step S22, the optimizer processing unit checks whether the most opened regulating zone valve V1, V2, V61, V62 has a current orifice or opening that exceeds an upper opening limit, e.g. an upper opening limit of 90% (of the completely open valve).

If the most opened regulating zone valve V1, V2, V61, V62 exceeds the upper opening limit, the optimizer processing unit proceeds in step S23 by setting the respective line valve VE, VEa, VEb, ..., VEn, VE1, VE2 to a more open position, i.e. the line valve VE, VEa, VEb, ..., VEn, VE1, VE2 which is arranged in the supply line L, La, Lb, ..., Ln, L1, L2 that feeds the respective zone Z1, Z2. As a consequence, the flow in the respective supply line L, La, Lb, ..., Ln, L1, L2 and, thus, into the connected zone Z1, Z2 will increase, and subsequently, to meet set targets, the regulating zone valve V1, V2, V61, V62 in the respective zone Z1, Z2 will decrease their opening levels, as will be described below in connection with steps S3 and S4.

Otherwise, if the most opened regulating zone valve V1, V2, V61, V62 does not exceed the upper opening limit, the optimizer processing unit proceeds in step S24 by checking whether the most opened regulating zone valve V1, V2, V61, V62 has a current orifice or opening that is below a lower opening limit, e.g. a lower opening limit of 75% (of the completely open valve).

If the most opened regulating zone valve V1, V2, V61, V62 is below the lower opening limit, the optimizer processing unit proceeds in step S25 by setting the respective line valve VE, VEa, VEb, ..., VEn, VE1, VE2 to a more closed position, i.e. by reducing the degree of opening of the line valve VE, VEa, VEb, ..., VEn, VE1, VE2 which is arranged in the supply line L, La, Lb, ..., Ln, L1, L2 that feeds the respective zone Z1, Z2. As a consequence, the flow in the respective supply line L, La, Lb, ..., Ln, L1, L2 and, thus, into the connected zone Z1, Z2 will decrease, and subsequently, to meet set targets, the regulating zone valve V1, V2, V61, V62 in the respective zone Z1, Z2 will increase their opening levels, as will be described below in connection with steps S3 and S4.

Commands and values for setting the adjusted positions are transmitted from the optimizer processing unit to the respective line valves VE, VEa, VEb, ..., VEn, VE1, VE2 via a communication bus, a local area network (LAN), and/or a wireless LAN (WLAN), radio communication network (GSM, UMTS) or communication interface, such as Bluetooth, RFID, NFC or the like.

Figure 10:
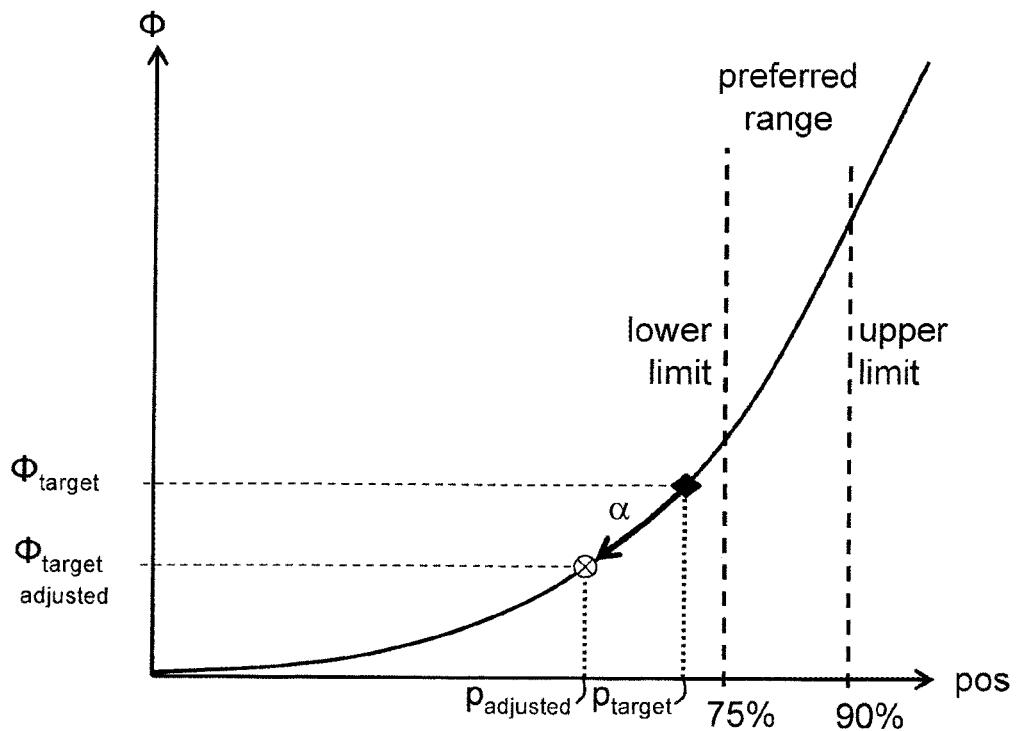
FIG. 10: shows a graph illustrating a characteristic curve for a regulating zone valve showing for a given pressure the flow of fluid depending on the position of the regulating zone valve.

As indicated above, increasing the flow through the supply line L, La, Lb, ..., Ln, L1, L2, causes the regulating zone valves V1, V2, V61, V62 to reduce their opening and, ultimately, to move the valve position (of the most opened regulating zone valve V1, V2, V61, V62) exceeding the upper opening limit to a value within a more optimal preferred range; in reverse, decreasing the flow through the supply line L, La, Lb, ..., Ln, L1, L2, causes the regulating zone valves V1, V2, V61, V62 to increase their opening and, ultimately, to move a valve position (of the most opened regulating zone valve V1, V2, V61, V62) below the lower opening limit to a value within the more optimal preferred range. As can be seen in FIG. 10, by maintaining the valve position pos of the most opened regulating zone valve V1, V2, V61, V62 within the preferred range, defined by the upper and lower opening limits, the target flows are obtained more efficiently with respect to required pumping energy (no need to waste high pumping power to overcome the obstacles of barely open valves), and the flow $\phi$ through the regulating zone valve V1, V2, V61, V62 can be controlled more precisely and linearly.

In step S3, the multi-zone processing unit receives a measurement of the current total flow of fluid $\phi_{tot}$, $\phi_{tota}$, $\phi_{totb}$, ..., $\phi_{totn}$, $\phi_{tot1}$, $\phi_{tot2}$ through a supply line L, La, Lb, ..., Ln, L1, L2 to the zones Z1, Z2. The measurement of the total flow of fluid $\phi_{tot}$, $\phi_{tota}$, $\phi_{totb}$, ..., $\phi_{totn}$, $\phi_{tot1}$, $\phi_{tot2}$ is reported by (push) or retrieved from (pull) the processing unit (controller) RE, REa, REb, ..., REn, RE1, RE2 connected to the one common flow sensor S arranged in the respective supply line L, La, Lb, ..., Ln, L1, L2 via a communication bus, a local area network (LAN), and/or a wireless LAN (WLAN), radio communication network (GSM, UMTS) or communication interface, such as Bluetooth, RFID, NFC or the like.

In step S4, the multi-zone processing unit determines and sets adjusted valve positions for the regulating zone valve V1, V2, V61, V62 depending on the current total flow of fluid $\phi_{tot}$, $\phi_{tota}$, $\phi_{totb}$, ..., $\phi_{totn}$, $\phi_{tot1}$, $\phi_{tot2}$ through the supply line L, La, Lb, ..., Ln, L1, L2 to the respective zones Z1, Z2 and the target flows for the zones Z1, Z2.

Figure 8:
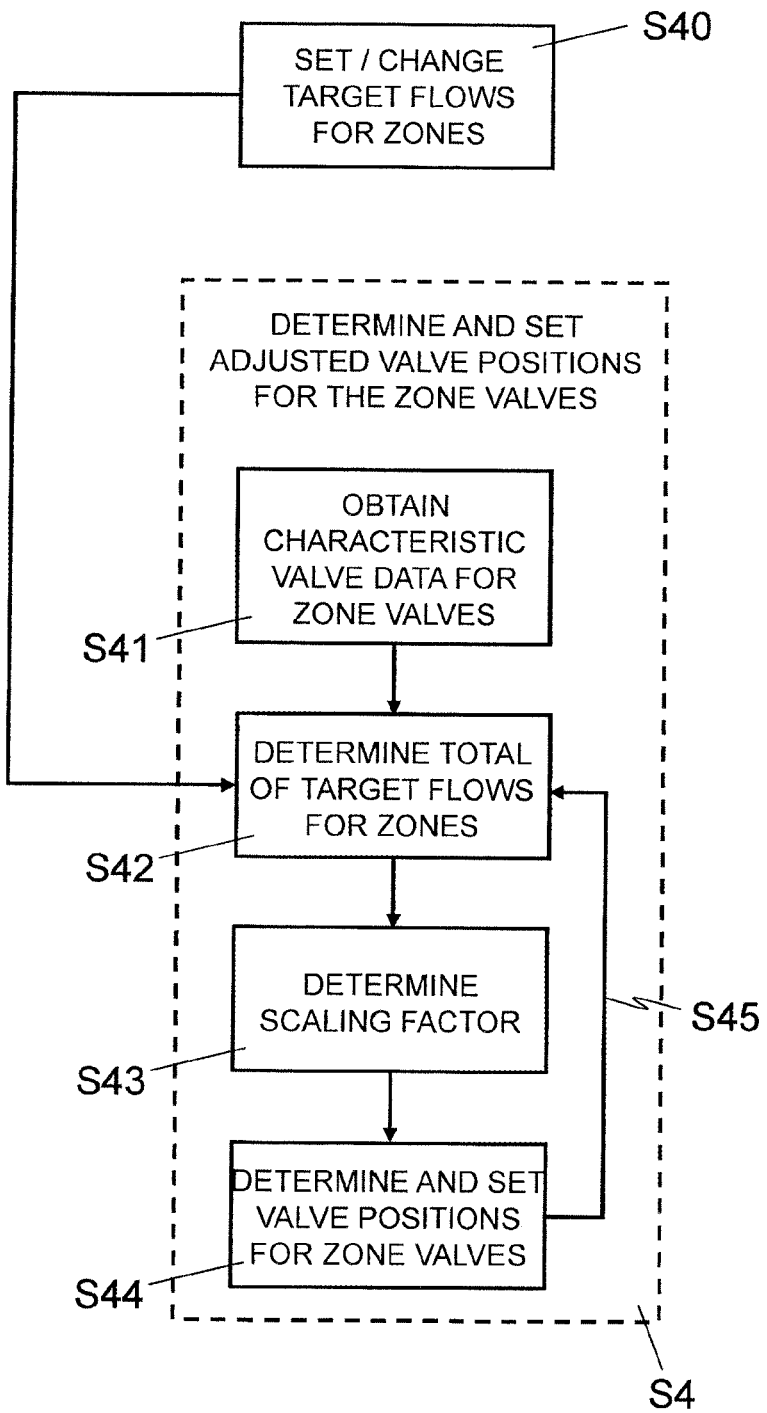
FIG. 8: shows a flow diagram illustrating an exemplary sequence of steps for determining and setting adjusted valve positions of the regulating zone valves in each zone of the fluid transportation network.

As illustrated in FIG. 8, target flows are set for the zones Z1, Z2 (as indicated in step S40), e.g. by the fluid transportation network controller 10 or by the processing units (or controllers) R1, R2 of the regulating zone valve V1, V2, V61, V62, as determined in response to requests from a building control system or a user entered via a user terminal.

Specifically, in step S4, the multi-zone processing unit performs a dynamic balancing and adjustment of the regulating zone valves V1, V2, V61, V6 by determining and setting the adjusted valve positions for the regulating zone valve V1, V2, V61, V62 depending on a ratio of the total target flow to the measured current total flow, i.e. ratio of the total of the target flows, set (in step S40) for the regulating zone valves V1, V2, V61, V62 of the zones Z1, Z2 fed by the supply line L, La, Lb, ..., Ln, L1, L2, to the current total flow of fluid $\phi_{tot}$, $\phi_{tota}$, $\phi_{totb}$, ..., $\phi_{totn}$, $\phi_{tot1}$, $\phi_{tot2}$ through the supply line L, La, Lb, ..., Ln, L1, L2 to the respective zones Z1, Z2. For example, the multi-zone processing unit performs the dynamic balancing (re-determining and re-adjusting) of the regulating zone valves V1, V2, V61, V6 as described by the Applicant in patent applications WO20013/000785 or WO2014/094991 and outlined below with reference to steps S41-S44.

In step S41, the multi-zone processing unit obtains characteristic valve data for the respective regulating zone valves V1, V2, V61, V62. The characteristic valve data indicate for a defined pressure the flow of fluid $\phi_1$, $\phi_2$ through the valve V1, V2, V61, V62 depending on the valve position $pos_1$, $pos_2$ (or degree of orifice or opening). Depending on the embodiment, the characteristic valve data of the regulating zone valves V1, V2, V61, V62 are stored as defined by characteristic valve curves provided by the manufacturer of the respective valves, or determined through measurements as described, for example, in WO 2013/000785 or WO20014/094991, incorporated herein by reference, or a combination thereof, using the characteristic valve curves as initial values and subsequent measurements for a system specific refinement of the characteristic valve data.

FIG. 10 shows a graph which illustrates the characteristic curve of the regulating zone valves V1, V2, V61, V62 as defined by the characteristic valve data; the curve shows for a given pressure the flow of fluid ϕ depending on the position pos of the regulating zone valve V1, V2, V61, V62.

In step S42, the multi-zone processing unit determines from the target flows set (in step S40) for the regulating zone valves V1, V2, V61, V62 the total target flow into the zones Z1, Z2 fed by the respective supply line L, La, Lb, . . . , Ln, L1, L2.

In step S43, the multi-zone processing unit determines a scaling factor α from the measurement of the current total flow $\phi_{tot}, \phi_{tota}, \phi_{totb}, \ldots, \phi_{totn}, \phi_{tot1}, \phi_{tot2}$, through the supply line L, La, Lb, . . . , Ln, L1, L2, and from the total target flow into the zones Z1, Z2 fed by the respective supply line L, La, Lb, . . . , Ln, L1, L2:

$$\alpha = \frac{\Phi_{total\_target}}{\Phi_{total\_measured}}$$

In Step S44, the multi-zone processing unit determines and sets adjusted valve positions for the regulating zone valves V1, V2, V61, V62 by adjusting the target flows $\Phi_{target}$ for each of the respective regulating zone valves V1, V2, V61, V62 with the scaling factor $\Phi_{target\_adjusted} = \alpha \cdot \Phi_{target}$, and by determining from the characteristic valve data of the respective regulating zone valve V1, V2, V61, V62 the adjusted valve position, using the adjusted target flow $\Phi_{target\_adjusted}$. Commands and values for setting the adjusted positions are transmitted from the multi-zone processing unit to the respective regulating zone valves V1, V2, V61, V6 via a communication bus, a local area network (LAN), and/or a wireless LAN (WLAN), radio communication network (GSM, UMTS) or communication interface, such as Bluetooth, RFID, NFC or the like.

FIG. 10 illustrates schematically, for a current target flow $\Phi_{target}$ of a regulating zone valve V1, V2, V61, V62 or zone Z1, Z2, respectfully, the adjusted target flow $\Phi_{target\_adjusted}$ as determined based on the ratio of the total target flow to the measured current total flow, using the scaling factor α. Furthermore, FIG. 10 illustrates the current valve position $p_{target}$ of the respective regulating zone valve V1, V2, V61, V62 and the adjusted valve position $p_{adjusted}$ for the respective regulating zone valve V1, V2, V61, V62 that corresponds to the adjusted target flow $\Phi_{target\_adjusted}$ for the respective regulating zone valve V1, V2, V61, V62, as defined by the characteristic valve data of the the respective regulating zone valve V1, V2, V61, V62. Basically, at a particular (common) pressure, the characteristic valve data establishes a relationship, characteristic valve curves, for the regulating zone valves V1, V2, V61, V62 in the zones Z1, Z2, between valve positions and flow. As the pressure changes, the characteristic valve curves defined by the characteristic valve data are scaled by a common factor and new position vs flow relationships are established for the regulating zone valves V1, V2, V61, V62 in the zones Z1, Z2.

As indicated in step S45, determining the scaling factor α and the dynamic balancing and adjustment of the regulating zone valves V1, V2, V61, V6 are performed periodically, for example with a period of three to thirty seconds, e.g. every five or ten seconds.

Figure 9:
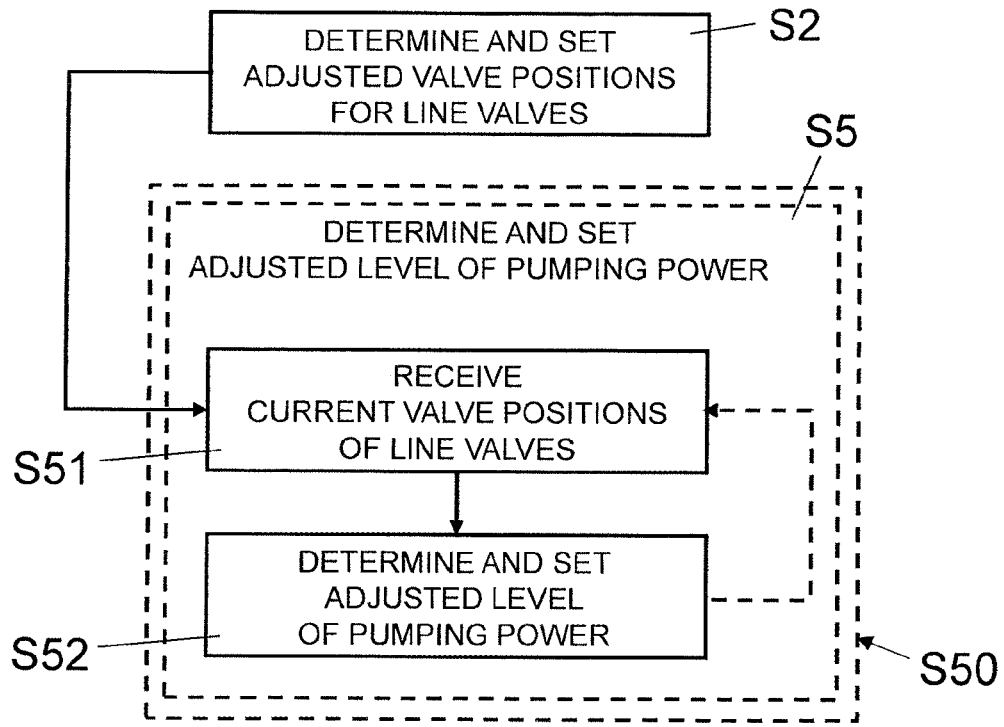
FIG. 9: shows a flow diagram illustrating an exemplary sequence of steps for determining and setting an adjusted level of the pumping power of a pump in the fluid transportation network.

As indicated schematically in FIG. 9 by reference numeral 550, the power processing unit determines and sets the level of pumping power for a pump P, P1, P2, of the fluid transportation circuit C, C1, C2, depending on current operating parameters of the pressure regulating devices PR, PRa, PRb, PRn, PR1, PR2 arranged in the respective supply lines L, La, Lb, Ln, L1, L2 or return lines LR, LRa, LRb, LRn, LR1, LR2 of the network sections F, Fa, Fb, Fn, F6. Depending on the embodiment and/or configuration, the monitored operating parameters of the pressure regulating devices PR, PRa, PRb, PRn, PR1, PR2 include pressure or flow values measured in the respective supply lines L, La, Lb, Ln, L1, L2 or return lines LR, LRa, LRb, LRn, LR1, LR2, or valve positions of the controllable line valves VE, VEa, VEb, . . . , VEn, VE1, VE2. The overall target is to minimize the pumping energy for the pumps P, P1, P2a while still achieving enough pressure such that the pressure invariant regulating systems PI1, PI2 operate within their respective specified pressure ranges when delivering set-point flows.

In the following paragraphs, described with reference to FIG. 9 is a sequence of steps for adjusting the level of pumping power for the pump P, P1, P2 of the fluid transportation circuit C, C1, C2, depending on current valve positions of the controllable line valves VE, VEa, VEb, . . . , VEn, VE1, VE2.

As illustrated in FIG. 9, in step S5, the power processing unit determines and sets adjusted levels of pumping power for the pump P, P1, P2 Of the fluid transportation network 1. Depending on the embodiment and/or configuration, the power processing unit performs step S5 in response to changes in the settings of the valve positions of the line valves VE, VEa, VEb, . . . , VEn, VE1, VE2, e.g. in step S2 as described above, or periodically, for example with a period of three to thirty seconds, e.g. every five or ten seconds.

In step S51, the power processing unit receives the current valve positions of the line valves VE, VEa, VEb, . . . , VEn, VE1, VE2 Of the hydraulic system 1. The current valve positions are reported by (push) or retrieved from (pull) the processing units (controllers) RE, REa, REb, . . . , REn, RE1, RE2 Of the motors M of the line valves VE, VEa, VEb, . . . , VEn, VE1, VE2 via a communication bus, a local area network (LAN), and/or a wireless LAN (WLAN), radio communication network (GSM, UMTS) or communication interface, such as Bluetooth, RFID, NFC or the like.

In step S52, the power processing unit determines and sets the level of pumping power for the pump P, P1, P2 of the fluid transportation circuit C, C1, C2 depending on the valve positions of the line valves VE, VEa, VEb, VEn, VE1, VE2. Specifically, the power processing unit checks whether the most opened line valve VE, VEa, VEb, . . . , VEn, VE1, VE2 has a current orifice or opening that exceeds an upper opening limit, e.g. an upper opening limit of 90% (of the completely open valve). If the most opened line valve VE, VEa, VEb, . . . , VEn, VE1, VE2 exceeds the upper opening limit, the power processing unit increases the level of pumping power by a defined degree. As a consequence, the pressure increases in the respective fluid transportation circuit C, C1, C2 and, thus, in the respective supply lines L, La, Lb, . . . , Ln, L1, L2, and subsequently, to meet set targets, the respective line valves VE, VEa, VEb, . . . , VEn, VE1, VE2 will decrease their opening levels. Otherwise, if the most opened line valve VE, VEa, VEb, . . . , VEn, VE1, VE2 does not exceed the upper opening limit, the power processing unit checks whether the most opened line valve VE, VEa, VEb, . . . , VEn, VE1, VE2 has a current orifice or opening that is below a lower opening limit, e.g. a lower opening limit of 75% (of the completely open valve). If the most opened line valve VE, VEa, VEb, . . . , VEn, VE1, VE2 is below the lower opening limit, the power processing unit decreases the level of pumping power by a defined degree proceeds. As a consequence, the pressure decreases in the respective fluid transportation circuit C, C1, C2 and, thus, in the respective supply lines L, La, Lb, . . . , Ln, L1, L2, and subsequently, to meet set targets, the respective line valves VE, VEa, VEb, . . . , VEn, VE1, VE2 will increase their opening levels. Thus, the power processing unit controls the pumping power and, thus, the pressure in the respective fluid transportation circuit C, C1, C2 such that the valve position pos of the most opened line valve VE, VEa, VEb, . . . , VEn, VE1, VE2 is maintained within a preferred, more energy efficient range, defined by the upper and lower opening limits, where the target flows are obtained more efficiently with respect to required pumping energy. Commands and values for setting the adjusted level of pumping power are transmitted from the power processing unit to the respective pump P, P1, P2 via a communication bus, a local area network (LAN), and/or a wireless LAN (WLAN), radio communication network (GSM, UMTS) or communication interface, such as Bluetooth, RFID, NFC or the like.

In an embodiment, the filter processing unit detects and attenuates undesirable oscillation in the fluid transportation network 1, e.g. hunting oscillation. Specifically, the filter processing unit detects oscillation in one or more control or feedback signals of the fluid transportation network 1, e.g. current valve positions of the regulating zone valves V1, V2, V61, V6, set points for adjusted valve positions of the regulating zone valves V1, V2, V61, V6, current valve positions of the line valves VE, VEa, VEb, . . . , VEn, VE1, VE2, set points for adjusted valve positions of the line valves VE, VEa, VEb, . . . , VEn, VE1, VE2, the current total flow of fluid $\phi_{tot}$, $\phi_{tota}$, $\phi_{totb}$, . . . , $\phi_{totn}$, $\phi_{tot1}$, $\phi_{tot2}$ through a supply line L, La, Lb, . . . , Ln, L1, L2 to the zones Z1, Z2, and/or control signals received from a superior building control system. In an embodiment, for detecting and attenuating undesirable oscillation, the filter processing unit implements and applies a lag filter (or compensator), a lead filter (or compensator), or a combined lag/lead filter (or compensator) to the one or more control or feedback signals of the fluid transportation network 1. Operating frequencies for the filters (or compensators) are determined by the filter processing unit using observation (time) windows. The observation windows are updated on an ongoing basis according to the FIFO principle. The observation windows are scaled to fit the frequencies which are to be detected (e.g. a 15 minute window covers frequencies up to 1/(2·15·60) Hz). The filter processing unit determines the most disturbing frequency, using the general criteria of the lower the frequency and the higher the magnitude the more disturbing. The oscillation frequency which is to be attenuated is used to calculate filter parameters, e.g. parameters a and b in the lag filter (Laplace form)

$$\frac{\frac{b}{a}s+b}{s+b}.$$

The filter processing unit monitors the impact of the applied filter parameters and adjusts the parameters, if undesired behaviour is detected, i.e. amplification instead of attenuation. The filter parameters include an instantaneous component, relating to the current situation, and a long term component, derived through a preceding time period (self-learning). The impact of each component is weighted, e.g. with a weighting factor in a range from 0 to 1. The filter processing unit is further configured to disable or reset the filter (or compensation) functions to lower frequencies in order to better follow fast setpoint changes (e.g. during start up or shut down situations).

It should be noted that, in the description, the computer program code has been associated with specific functional modules or processors, and the sequence of the steps has been presented in a specific order, one skilled in the art will understand, however, that the computer program code may be structured differently and that the order of at least some of the steps could be altered, without deviating from the scope of the invention.

I should be further noted, that in case of a gaseous fluid, e.g. air, the zone valves V1, V2, V61, V62 and line valves VE, VEa, VEb, . . . , VEn, VE1, VE2 are implemented as dampers and the common source or drive is implemented as a motorized fan or ventilator.

The invention claimed is:

1. A method of controlling a liquid transportation network (1) that comprises one or more network sections (F, Fa, Fb, Fn, F6), each network section (F, Fa, Fb, Fn, F6) being connected to a liquid transportation circuit (C, C1, C2) through a respective supply line (L, La, Lb, Ln, L1, L2) and comprising one or more parallel zones (Z1, Z2), the method comprising:

arranging a pressure invariant regulating system (PI1, PI2) in each of the zones (Z1, Z2) to implement each of the zones (Z1, Z2) as a pressure independent branch of the respective network section (F, Fa, Fb, Fn, F6);

arranging in the supply lines (L, La, Lb, Ln, L1, L2) or respective return lines (LR, LRa, LRb, LRn, LR1, LR2) of each of the network sections (F, Fa, Fb, Fn, F6) a pressure regulating device (PR, PRa, PRb, PRn, PR1, PR2); and controlling by a first processing unit (RE, REa, REb, REn, RE1, RE2, 10) the pressure regulating devices (PR, PRa, PRb, PRn, PR1, PR2) of each of the network sections (F, Fa, Fb, Fn, F6) to operate the pressure independent branches of the respective network section (F, Fa, Fb, Fn, F6) within a specified pressure range, defined by device specifications of the pressure invariant regulating system (PI1, PI2) in each of the zones (Z1, Z2), wherein the pressure invariant regulating systems (PI1, PI2) are each implemented as a regulating zone valve (V1, V2) in each zone (Z1, Z2) for regulating a flow of liquid ($\Phi1$, $\Phi2$) through the respective zone (Z1, Z2).

2. The method of claim 1, further comprising determining and setting by a second processing unit (RE, REa, REb, REn, RE1, RE2, 10) a level of pumping power for a pump (P, P1, P2) of the liquid transportation circuit (C, C1, C2), depending on current operating parameters of the pressure regulating devices (PR, PRa, PRb, PRn, PR1, PR2) arranged in the respective supply lines (L, La, Lb, Ln, L1, L2) or return lines (LR, LRa, LRb, LRn, LR1, LR2) of the network sections (F, Fa, Fb, Fn, F6).

3. A method of controlling a liquid transportation network (1) that comprises one or more network sections (F, Fa, Fb, Fn, F6), each network section (F, Fa, Fb, Fn, F6) being connected to a liquid transportation circuit (C, C1, C2) through a respective supply line (L, La, Lb, Ln, L1, L2) and comprising one or more parallel zones (Z1, Z2), the method comprising:

arranging a pressure invariant regulating system (PI1, PI2) in each of the zones (Z1, Z2) to implement each of the zones (Z1, Z2) as a pressure independent branch of the respective network section (F, Fa, Fb, Fn, F6);

arranging in the supply lines (L, La, Lb, Ln, L1, L2) or respective return lines (LR, LRa, LRb, LRn, LR1, LR2) of each of the network sections (F, Fa, Fb, Fn, F6) a pressure regulating device (PR, PRa, PRb, PRn, PR1, PR2); and controlling by a first processing unit (RE, REa, REb, REn, RE1, RE2, 10) the pressure regulating devices (PR, PRa, PRb, PRn, PR1, PR2) of each of the network sections (F, Fa, Fb, Fn, F6) to operate the pressure independent branches of the respective network section (F, Fa, Fb, Fn, F6) within a specified pressure range, defined by device specifications of the pressure invariant regulating system (PI1, PI2) in each of the zones (Z1, Z2), wherein the pressure invariant regulating systems (PI1, PI2) are each implemented as a regulating zone valve (V1, V2) in each zone (Z1, Z2) for regulating a flow of liquid ($\Phi_1$, $\Phi_2$) through the respective zone (Z1, Z2);

wherein the pressure regulating devices (PR, PRa, PRb, . . . , PRn, PR1, PR2) are each implemented as a line valve (VE, VEa, VEb, VEn, VE1, VE2) arranged in the respective supply lines (L, La, Lb, Ln, L1, L2) or return lines (LR, LRa, LRb, LRn, LR1, LR2) of the network sections (F, Fa, Fb, Fn, F6); and the method further comprises receiving in the first processing unit (RE, REa, REb, REn, RE1, RE2, 10) valve positions ($pos_1$, $pos_2$) of the regulating zone valves (V1, V2); and determining and setting by the first processing unit (RE, REa, REb, REn, RE1, RE2, 10), depending on the valve positions ($pos_1$, $pos_2$) of the regulating zone valves (V1, V2), an adjusted valve position for a line valve (VE, VEa, VEb, VEn, VE1, VE2) arranged in the supply line (L, La, Lb, Ln, L1, L2) or a respective return line (LR, LRa, LRb, LRn, LR1, LR2).

4. The method of claim 3, wherein determining the adjusted valve position for the line valve (VE, VEa, VEb, VEn, VE1, VE2) comprises determining whether the valve position ($pos_1$, $pos_2$) of the regulating zone valve (V1, V2) that is opened most is within defined lower and upper opening limits;

setting the adjusted valve position for the line valve (VE, VEa, VEb, VEn, VE1, VE2) to a value representative of a more open setting, if the valve position ($pos_1$, $pos_2$) of the regulating zone valve (V1, V2) that is opened most is above the upper opening limit; and setting the adjusted valve position for the line valve (VE, VEa, VEb, VEn, VE1, VE2) to a value representative of a more closed setting, if the valve position ($pos_1$, $pos_2$) of the regulating zone valve (V1, V2) that is opened most is below the lower opening limit.

5. The method of claim 3,
wherein the regulating zone valves are implemented as six-way valves configured to couple a respective zone (Z1, Z2) alternatively to a first liquid transportation circuit (C1) for heating or to a second liquid transportation circuit (C2) for cooling, and to regulate the flow of liquid ($\Phi_1$, $\Phi_2$) from the first or second liquid transportation circuit (C1, C2), respectively, through the zone (Z1, Z2); and the method comprises receiving in the first processing unit (RE1, RE2, 10) valve positions ($pos_1$, $pos_2$) of the six-way regulating zone valves (V61, V62); calculating and setting by the first processing unit (RE1, RE2, 10), depending on the valve positions ($pos_1$, $pos_2$) of the six-way regulating zone valves (V61, V62), an adjusted valve position for a valve (VE1) arranged in a supply line (L1) or a respective return line (LR1) of the first liquid transportation circuit (C1) and an adjusted valve position for a line valve (VE2) arranged in a supply line (L2) or a respective return line (LR2) of the second liquid transportation circuit (C2).

6. The method of claim 3,
wherein the liquid transportation network (1) comprises a plurality of network sections (F, Fa, Fb, Fn, F6); and the method comprises receiving in the second processing unit (RE, REa, REb, REn, RE1, RE2, 10) valve positions ($pos_1$, $pos_2$) of the line valves (VE, VEa, VEb, VEn, VE1, VE2) arranged in the respective supply line (L, La, Lb, Ln, L1, L2) or return line (LR, LRa, LRb, LRn, LR1, LR2); and determining and setting by the second processing unit (RE, REa, REb, REn, RE1, RE2, 10) a level of pumping power for a pump (P, P1, P2) of the liquid transportation circuit (C, C1, C2), depending on the valve positions ($pos_1$, $pos_2$) of the line valves (VE, VEa, VEb, VEn, VE1, VE2) arranged in the respective supply line (L, La, Lb, Ln, L1, L2) or return line (LR, LRa, LRb, LRn, LR1, LR2).

7. The method of claim 3, further comprising
receiving in a third processing unit (RE, REa, REb, REn, RE1, RE2, 10) a measurement of a total flow of liquid ($\Phi_{tot}$, $\Phi_{tota}$, $\Phi_{totb}$, $\Phi_{totn}$, $\Phi_{tot1}$, $\Phi_{tot2}$) through the supply line (L, La, Lb, Ln, L1, L2); and determining and setting by the third processing unit (RE, REa, REb, REn, RE1, RE2, 10), depending on the measurement of the total flow of liquid ($\Phi_{tot}$, $\Phi_{tota}$, $\Phi_{totb}$, $\Phi_{totn}$, $\Phi_{tot1}$, $\Phi_{tot2}$) through the supply line (L, La, Lb, Ln, L1, L2) and a total of target flows for the zones (Z1, Z2), adjusted valve positions for the regulating zone valves (V1, V2) of the zones (Z1, Z2).

8. The method of claim 7, wherein determining the adjusted valve positions for the regulating zone valves (V1, V2) comprises performing a dynamic balancing of the zones (Z1 Z2) by setting the valve positions ($pos_1$, $pos_2$) of the regulating zone valves (V1, V2) based on the target flows for the zones (Z1, Z2) and the total flow of liquid ($\Phi_{tot}$, $\Phi_{tota}$, $\Phi_{totb}$, $\Phi_{totn}$, $\Phi_{tot1}$, $\Phi_{tot2}$) through the supply line (L, La, Lb, Ln, L1, L2), using characteristic valve data of the regulating zone valves (V1, V2) which define valve positions ($pos_1$, $pos_2$) for the corresponding regulating zone valve (V1, V2) for a specific target flow.

9. The method of claim 8, further comprising a fourth processing unit (RE, REa, REb, REn, RE1, RE2, 10) detecting and attenuating oscillation in one or more control or feedback signals of the liquid transportation network (1), the control or feedback signals of the liquid transportation network (1) including at least one of: current valve positions of the regulating zone valves (V1, V2, V61, V6), set points for adjusted valve positions of the regulating zone valves (V1, V2, V61, V6), current valve positions of the line valve (VE, VEa, VEb, . . . , VEn, VE1, VE2), set points for adjusted valve positions of the line valve (VE, VEa, VEb, . . . , VEn, VE1, VE2), and current total flow of liquid ($\Phi_{tot}$, $\Phi_{tota}$, $\Phi_{totb}$, ..., $\Phi_{totn}$, $\Phi_{tot1}$, $\Phi_{tot2}$) through the supply line (L, La, Lb, ..., Ln, L1, L2) to the zones (Z1, Z2).

10. A liquid transportation network (1) that comprises one or more network sections (F, Fa, Fb, Fn, F6), each network section (F, Fa, Fb, Fn, F6) being connected to a liquid transportation circuit (C, C1, C2) through a respective supply line (L, La, Lb, Ln, L1, L2) and comprising one or more parallel zones (Z1, Z2), wherein the liquid transportation network (1) further comprises:
  pressure invariant regulating systems (PI1, PI2) arranged in each of the zones (Z1, Z2) and configured to implement each of the zones (Z1, Z2) as a pressure independent branch of the respective network section (F, Fa, Fb, Fn, F6);
  a pressure regulating device (PR, PRa, PRb, PRn, PR1, PR2) arranged in the supply lines (L, La, Lb, Ln, L1, L2) or respective return lines (LR, LRa, LRb, LRn, LR1, LR2) of each of the network sections (F, Fa, Fb, Fn, F6); and
  a first processing unit (RE, REa, REb, REn, RE1, RE2, 10) configured to control the pressure regulating devices (PR, PRa, PRb, PRn, PR1, PR2) of each of the network sections (F, Fa, Fb, Fn, F6) to operate the pressure independent branches of the respective network section (F, Fa, Fb, Fn, F6) within a specified pressure range, defined by device specifications of the pressure invariant regulating system (PI1, PI2) in each of the zones (Z1, Z2)),
  wherein the pressure invariant regulating systems (PI1, PI2) are each implemented as a regulating zone valve (V1, V2) in each zone (Z1, Z2) for regulating a flow of liquid ($\Phi1$, $\Phi2$) through the respective zone (Z1, Z2).

11. The liquid transportation network (1) of claim 10, further comprising
  a pump (P, P1, P2) arranged in the liquid transportation circuit (C, C1, C2); and
  a second processing unit (RE, REa, REb, REn, RE1, RE2, 10) configured to determine and set a level of pumping power for the pump (P, P1, P2) of the liquid transportation circuit (C, C1, C2), depending on current operating parameters of the pressure regulating devices (PR, PRa, PRb, PRn, PR1, PR2) arranged in the respective supply lines (L, La, Lb, Ln, L1, L2) or return lines (LR, LRa, LRb, LRn, LR1, LR2) of the network sections (F, Fa, Fb, Fn, F6).

12. A liquid transportation network (1) that comprises one or more network sections (F, Fa, Fb, Fn, F6), each network section (F, Fa, Fb, Fn, F6) being connected to a liquid transportation circuit (C, C1, C2) through a respective supply line (L, La, Lb, Ln, L1, L2) and comprising one or more parallel zones (Z1, Z2), wherein the liquid transportation network (1) further comprises:
  pressure invariant regulating systems (PI1, PI2) arranged in each of the zones (Z1, Z2) and configured to implement each of the zones (Z1, Z2) as a pressure independent branch of the respective network section (F, Fa, Fb, Fn, F6);
  a pressure regulating device (PR, PRa, PRb, PRn, PR1, PR2) arranged in the supply lines (L, La, Lb, Ln, L1, L2) or respective return lines (LR, LRa, LRb, LRn, LR1, LR2) of each of the network sections (F, Fa, Fb, Fn, F6); and
  a first processing unit (RE, REa, REb, REn, RE1, RE2, 10) configured to control the pressure regulating devices (PR, PRa, PRb, PRn, PR1, PR2) of each of the network sections (F, Fa, Fb, Fn, F6) to operate the pressure independent branches of the respective network section (F, Fa, Fb, Fn, F6) within a specified pressure range, defined by device specifications of the pressure invariant regulating system (PI1, PI2) in each of the zones (Z1, Z2)),
  wherein the pressure invariant regulating systems (PI1, PI2) are each implemented as a regulating zone valve (V1, V2) in each zone (Z1, Z2) for regulating a flow of liquid ($\Phi_1$, $\Phi_2$) through the respective zone (Z1, Z2);
  wherein the pressure regulating devices (PR, PRa, PRb, ..., PRn, PR1, PR2) are each implemented as a line valve (VE, VEa, VEb, VEn, VE1, VE2) arranged in the respective supply lines (L, La, Lb, Ln, L1, L2) or return lines (LR, LRa, LRb, LRn, LR1, LR2) of the network sections (F, Fa, Fb, Fn, F6); and
  wherein the first processing unit (RE, REa, REb, REn, RE1, RE2, 10) is configured to receive valve positions ($pos_1$, $pos_2$) of the regulating zone valves (V1, V2), and determine and set, depending on the valve positions ($pos_1$, $pos_2$) of the regulating zone valves (V1, V2), an adjusted valve position for a line valve (VE, VEa, VEb, VEn, VE1, VE2) arranged in the supply line (L, La, Lb, Ln, L1, L2) or a respective return line (LR, LRa, LRb, LRn, LR1, LR2).

13. The liquid transportation network (1) of claim 12, wherein the first processing unit (RE, REa, REb, REn, RE1, RE2, 10) is configured to determine the adjusted valve position for the line valve (VE, VEa, VEb, VEn, VE1, VE2) by determining whether the valve position ($pos_1$, $pos_2$) of the regulating zone valve (V1, V2) that is opened most is within defined lower and upper opening limits, setting the adjusted valve position for the line valve (VE, VEa, VEb, VEn, VE1, VE2) to a value representative of a more open setting, if the valve position ($pos_1$, $pos_2$) of the regulating zone valve (V1, V2) that is opened most is above the upper opening limit, and setting the adjusted valve position for the line valve (VE, VEa, VEb, VEn, VE1, VE2) to a value representative of a more closed setting, if the valve position ($pos_1$, $pos_2$) of the regulating zone valve (V1, V2) that is opened most is below the lower opening limit.

14. The liquid transportation network (1) of claim 12,
  wherein the regulating zone valves are implemented as six-way valves configured to couple a respective zone (Z1, Z2) alternatively to a first liquid transportation circuit (C1) for heating or to a second liquid transportation circuit (C2) for cooling, and to regulate the flow of liquid ($\Phi_1$, $\Phi_2$) from the first or second liquid transportation circuit (C1, C2), respectively, through the zone (Z1, Z2); and
  wherein the first processing unit (RE1, RE2, 10) is configured to receive valve positions ($pos_1$, $pos_2$) of the six-way regulating zone valves (V61, V62), and to calculate and set, depending on the valve positions ($pos_1$, $pos_2$) of the six-way regulating zone valves (V61, V62), an adjusted valve position for a valve (VE1) arranged in a supply line (L1) or a respective return line (LR1) of the first liquid transportation circuit (C1) and an adjusted valve position for a line valve (VE2) arranged in a supply line (L2) or a respective return line (LR2) of the second liquid transportation circuit (C2).

15. The liquid transportation network (1) of claim 12, wherein the liquid transportation network (1) comprises a plurality of network sections (F, Fa, Fb, Fn, F6); and the second processing unit (RE, REa, REb, REn, RE1, RE2, 10) is configured to receive valve positions ($pos_1$, $pos_2$) of the line valves (VE, VEa, VEb, VEn, VE1, VE2) arranged in the respective supply line (L, La, Lb, Ln, L1, L2) or return line (LR, LRa, LRb, LRn, LR1, LR2), and to determine and set a level of pumping power for a pump (P, P1, P2) of the liquid transportation circuit (C, C1, C2), depending on the valve positions ($pos_1$, $pos_2$) of the line valves (VE, VEa, VEb, VEn, VE1, VE2) arranged in the respective supply line (L, La, Lb, Ln, L1, L2) or return line (LR, LRa, LRb, LRn, LR1, LR2).

16. The liquid transportation network (1) of claim 12, further comprising a third processing unit (RE,
    REa, REb, REn, RE1, RE2, 10) configured to receive a measurement of a total flow of liquid ($\Phi_{tot}$, $\Phi_{tota}$, $\Phi_{totb}$, $\Phi_{totn}$, $\Phi_{tot1}$, $\Phi_{tot2}$) through the supply line (L, La, Lb, Ln, L1, L2), and determine and set, depending on the measurement of the total flow of liquid ($\Phi_{tot}$, $\Phi_{tota}$, $\Phi_{totb}$, $\Phi_{totn}$, $\Phi_{tot1}$, $\Phi_{tot2}$) through the supply line (L, La, Lb, Ln, L1, L2) and a total of target flows for the zones (Z1, Z2), adjusted valve positions for the regulating zone valves (V1, V2) of the zones (Z1, Z2).

17. The liquid transportation network (1) of claim 16, wherein the third processing unit (RE, REa, REb, REn, RE1, RE2, 10) is configured to determine the adjusted valve positions for the regulating zone valves (V1, V2) by performing a dynamic balancing of the zones (Z1 Z2) by setting the valve positions ($pos_1$, $pos_2$) of the regulating zone valves (V1, V2) based on the target flows for the zones (Z1, Z2) and the total flow of liquid ($\Phi_{tot}$, $\Phi_{tota}$, $\Phi_{totb}$, $\Phi_{totn}$, $\Phi_{tot1}$, $\Phi_{tot2}$) through the supply line (L, La, Lb, Ln, L1, L2), using characteristic valve data of the regulating zone valves (V1, V2) which define valve positions ($pos_1$, $pos_2$) for the corresponding regulating zone valve (V1, V2) for a specific target flow.

18. The liquid transportation network (1) of claim 12,
    wherein the first processing unit (RE, REa, REb, REn, RE1, RE2, 10) is arranged in a controller of the line valve (VE, VEa, VEb, VEn, VE1, VE2) arranged in a supply line (L, La, Lb, Ln, L1, L2) or a respective return line (LR, LRa, LRb, LRn, LR1, LR2); and
    wherein the first processing unit (RE, REa, REb, REn, RE1, RE2, 10) is configured to receive the valve positions ($pos_1$, $pos_2$) from controllers (R1, R2) of the regulating zone valves (V1, V2, V61, V62).

19. The liquid transportation network (1) of claim 12,
    wherein the third processing unit (RE, REa, REb, REn, RE1, RE2, 10) is arranged in a controller of the line valve (VE, VEa, VEb, VEn, VE1, VE2); and
    wherein the third processing unit (RE, REa, REb, REn, RE1, RE2, 10) is configured to transmit the adjusted valve positions to controllers (R1, R2) of the regulating zone valves (V1, V2, V61, V62).

20. The liquid transportation network (1) of claim 12, further comprising a fourth processing unit (RE, REa, REb, REn, RE1, RE2, 10) configured to detect and attenuate oscillation in one or more control or feedback signals of the liquid transportation network (1), the control or feedback signals of the liquid transportation network (1) including at least one of: current valve positions of the regulating zone valves (V1, V2, V61, V6), set points for adjusted valve positions of the regulating zone valves (V1, V2, V61, V6), current valve positions of the line valve (VE, VEa, VEb, . . . , VEn, VE1, VE2), set points for adjusted valve positions of the line valve (VE, VEa, VEb, . . . , VEn, VE1, VE2), and current total flow of liquid ($\Phi_{tot}$, $\Phi_{tota}$, $\Phi_{totb}$, . . . , $\Phi_{totn}$, $\Phi_{tot1}$, $\Phi_{tot2}$) through the supply line (L, La, Lb, . . . , Ln, L1, L2) to the zones (Z1, Z2).

* * * * *